US011595853B2

(12) United States Patent
Vesely et al.

(10) Patent No.: US 11,595,853 B2
(45) Date of Patent: Feb. 28, 2023

(54) REDIRECTION MECHANISM TO SUPPORT NETWORK SHARING/SLICING WITH CU-DU SPLIT

(71) Applicant: Telefonaktiebolaget LM Ericsson (publ), Stockholm (SE)

(72) Inventors: Alexander Vesely, Feldbach (AT); Matteo Fiorani, Solna (SE); Gunnar Mildh, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 44 days.

(21) Appl. No.: 17/282,822

(22) PCT Filed: Oct. 4, 2019

(86) PCT No.: PCT/IB2019/058494
§ 371 (c)(1),
(2) Date: Apr. 5, 2021

(87) PCT Pub. No.: WO2020/070720
PCT Pub. Date: Apr. 9, 2020

(65) Prior Publication Data
US 2021/0352531 A1   Nov. 11, 2021

Related U.S. Application Data

(60) Provisional application No. 62/741,358, filed on Oct. 4, 2018.

(51) Int. Cl.
*H04W 28/16* (2009.01)
*H04W 76/18* (2018.01)
(Continued)

(52) U.S. Cl.
CPC ........... *H04W 28/16* (2013.01); *H04W 48/17* (2013.01); *H04W 74/004* (2013.01); *H04W 76/18* (2018.02); *H04W 84/042* (2013.01)

(58) Field of Classification Search
CPC ..... H04W 28/16; H04W 48/17; H04W 48/18; H04W 74/004; H04W 76/18; H04W 84/042
See application file for complete search history.

(56) References Cited

U.S. PATENT DOCUMENTS

2018/0376380 A1* 12/2018 Leroux ................ H04W 76/27
2019/0380128 A1* 12/2019 Park .................. H04W 72/0433

FOREIGN PATENT DOCUMENTS

| CN | 108541032 A | 9/2018 |
| NO | 2020100053 A1 | 5/2020 |

(Continued)

OTHER PUBLICATIONS

Official Action for Russian Patent Application No. 2021112359, dated Dec. 16, 2021, 9 pages.
(Continued)

*Primary Examiner* — Robert C Scheibel
(74) *Attorney, Agent, or Firm* — Withrow & Terranova, PLLC

(57) ABSTRACT

Systems and methods for redirecting Radio Resource Control (RRC) messages in a wireless system that uses Central Unit (CU)/Distributed Unit (DU) splitting and either network sharing or network slicing are disclosed. In some embodiments, a method performed by a shared Distributed Unit (DU) comprises receiving a RRC message from a User Equipment (UE) and sending a first DU-to-Central Unit (CU) message to a first CU, where the first DU-to-CU message comprises the RRC message. The method further comprises either obtaining an indication that the first CU is a wrong CU for the RRC message or determining that the first CU is a wrong CU for the RRC message. The method further comprises sending another DU-to-CU message to a second CU, where the other DU-to-CU message comprises the RRC message or a RRC message related to the RRC message.

18 Claims, 14 Drawing Sheets

(51) Int. Cl.
*H04W 48/00* (2009.01)
*H04W 74/00* (2009.01)
*H04W 84/04* (2009.01)

(56) References Cited

FOREIGN PATENT DOCUMENTS

| RU | 2446637 C2 | 3/2012 |
|---|---|---|
| RU | 2654534 C1 | 5/2018 |
| RU | 2656885 C1 | 6/2018 |
| WO | 2017180221 A1 | 10/2017 |
| WO | 2018057908 A1 | 3/2018 |
| WO | 2018164469 A1 | 9/2018 |

OTHER PUBLICATIONS

Author Unknown, "Technical Specification Group Services and System Aspects; System Architecture for the 5G System; Stage 2 (Release 15)," Technical Specification 23.501, Version 15.3.0, 3GPP Organizational Partners, Sep. 2018, 226 pages.
Author Unknown, "Technical Specification Group Radio Access Network; NR; Radio Resource Control (RRC) protocol specification (Release 15)," Technical Specification 38.331, Version 15.6.0, 3GPP Organizational Partners, Jun. 2019, 517 pages.
Author Unknown, "Technical Specification Group Radio Access Network; NG-RAN; Architecture description (Release 15)," Technical Specification 38.401, Version 15.2.0, 3GPP Organizational Partners, Jun. 2018, 39 pages.
Author Unknown, "Technical Specification Group Radio Access Network; NG-RAN; Architecture description (Release 15)," Technical Specification 38.401, Version 15.3.0, 3GPP Organizational Partners, Sep. 2018, 39 pages.
Author Unknown, "Technical Specification Group Radio Access Network; NG-RAN; Architecture description (Release 15)," Technical Specification 38.401, Version 15.6.0, 3GPP Organizational Partners, Jun. 2019, 46 pages.
Author Unknown, "Technical Specification Group Radio Access Network; NG-RAN; F1 application protocol (F1AP) (Release 15)," Technical Specification 38.473, Version 15.6.0, 3GPP Organizational Partners, Jul. 2019, 220 pages.
Ericsson, "R3-181275: (TP for SA BL OR) gNB-DU admission control," Third Generation Partnership Project (3GPP), TSG RAN WG3 Meeting #99NR, Feb. 26-Mar. 2, 2018, 4 pages, Athens, Greece.
Ericsson, "R3-186053: Response paper to R3-185596 and R3-185739," Third Generation Partnership Project (3GPP), TSG-RAN WG3 Meeting #101bis, Oct. 8-12, 2018, 7 pages, Chengdu, P.R. China.
Ericsson, "R3-186056: Response paper to R3-185845," Third Generation Partnership Project (3GPP), TSG-RAN WG3 Meeting #101bis, Oct. 8-12, 2018, 4 pages, Chengdu, P.R. China.
Ericsson, "R3-186859: RAN sharing with multiple Cell ID broadcast," Third Generation Partnership Project (3GPP), TSG-RAN WG3 Meeting #102, Nov. 12-16, 2018, 8 pages, Spokane, WA, U.S.
Ericsson, "R3-193259: RAN sharing with multiple Cell ID broadcast," Third Generation Partnership Project (3GPP), TSG-RAN WG3 Meeting #104, May 13-17, 2019, 7 pages, Reno, NV, U.S.
Huawei, "R3-181119: TP for SA BL CR on gNB-CU behaviour without the presence of DU to CU RRC information," Third Generation Partnership Project (3GPP), TSG-RAN WG3 NR#99, Feb. 26-Mar. 2, 2018, 2 pages, Athens, Greece.
NEC, "R3-180774: Baseline CR for June version of TS 38.401 covering agreements of RAN3 #NR adhoc 1801," Third Generation Partnership Project (3GPP), TSG-RAN#99, Feb. 26-Mar. 2, 2018, 24 pages, Athens, Greece.
International Search Report and Written Opinion for International Patent Application No. PCT/IB2019/058494, dated Dec. 11, 2019, 17 pages.
International Search Report and Written Opinion for International Patent Application No. PCT/IB2019/059739, dated Feb. 19, 2020, 28 pages.
Written Opinion for International Patent Application No. PCT/IB2019/059739, dated Sep. 29, 2020, 8 pages.
International Preliminary Report on Patentability for International Patent Application No. PCT/IB2019/059739, dated Dec. 22, 2020, 53 pages.
Examination Report for Indian Patent Application No. 202147019900, dated Feb. 14, 2022, 5 pages.

\* cited by examiner

REDIRECTION MECHANISM TO SUPPORT NETWORK SHARING/SLICING WITH CU-DU SPLIT

RELATED APPLICATIONS

This application is a 35 U.S.C. § 371 national phase filing of International Application No. PCT/IB2019/058494, filed Oct. 4, 2019, which claims the benefit of U.S. provisional patent application Ser. No. 62/741,358, filed Oct. 4, 2018, the disclosures of which are hereby incorporated herein by reference in it entirety their entireties.

TECHNICAL FIELD

Systems and methods disclosed herein relate to network sharing or network slicing in a wireless network including base stations having a Central Unit (CU)/Distributed Unit (DU) split.

BACKGROUND

FIG. 1 depicts the current Fifth Generation (5G) Radio Access Network (RAN) architecture (also referred to as the Next Generation (NG) RAN, or NG-RAN), as described in Third Generation Partnership Project (3GPP) Technical Specification (TS) 38.401 (see e.g., V15.3.0). The NG architecture can be further described as follows. The NG-RAN consists of a set of NG Node Bs (gNBs) connected to a 5G Core Network (5GC) through an NG interface. A gNB can support Frequency Division Duplexing (FDD) mode, Time Division Duplexing (TDD) mode, or dual mode operation. gNBs can be interconnected through an Xn interface. A gNB may consist of a gNB Central Unit (gNB-CU) and one or more gNB Distributed Units (gNB-DUs). A gNB-DU is connected to a gNB-CU via an F1 logical interface. One gNB-DU is connected to only one gNB-CU.

NG, Xn, and F1 are logical interfaces. For NG-RAN, the NG and Xn-C interfaces for a gNB consisting of a gNB-CU and gNB-DUs terminate in the gNB-CU. For Evolved Universal Terrestrial Radio Access Network (E-UTRAN) New Radio—Dual Connectivity (EN-DC), the S1-U and X2-C interfaces for a gNB consisting of a gNB-CU and gNB-DUs terminate in the gNB-CU. The gNB-CU and connected gNB-DUs are only visible to other gNBs and the 5GC as a gNB.

The NG-RAN is layered into a Radio Network Layer (RNL) and a Transport Network Layer (TNL). The NG-RAN architecture, e.g. the NG-RAN logical nodes and interfaces between them, is defined as part of the RNL. For each NG-RAN interface (NG, Xn, F1), the related TNL protocol and the functionality are specified. The TNL provides services for User Plane (UP) transport and signaling transport. In NG-Flex configuration, each gNB is connected to all Access and Mobility Management Functions (AMFs) within an AMF Region. The AMF Region can be as defined in 3GPP TS 23.501 (see, e.g., V15.3.0).

The general principles for the specification of the F1 interface are as follows:
- the F1 interface is to be open;
- the F1 interface supports the exchange of signaling information between the endpoints, in addition the interface shall support data transmission to the respective endpoints;
- from a logical standpoint, the F1 is a point-to-point interface between the endpoints (a point-to-point logical interface should be feasible even in the absence of a physical direct connection between the endpoints);
- the F1 interface supports Control Plane (CP) and UP separation;
- the F1 interface separates RNL and TNL;
- the F1 interface enable exchanges of User Equipment (UE) associated information and non-UE associated information;
- the F1 interface is defined to be future proof to fulfill different new requirements and to support new services and new functions;
- one gNB-CU and a set of gNB-DUs are visible to other logical nodes as a gNB, where the gNB terminates X2, Xn, NG, and S1-U interfaces; and
- the Central Unit (CU) may be separated in the CP and the UP.

In regard to network sharing, according to 3GPP TS 23.501 (see, e.g., V15.3.0) § 5.18, the 5G System (5GS) supports a Multi Operator Core Network (MOCN) scenario, where several operators share RAN resources. As compared to MOCN defined for Third Generation (3G) and Fourth Generation (4G) (up to Release 13), there are two kinds of MOCN configurations:
1. single Cell Identity (ID)/Tracking Area Code (TAC) cell configuration, and
2. multiple Cell ID/TAC cell configuration.

Single Cell ID/TAC cell configuration refers to the "classical" MOCN configuration, which was defined up to Release 13 for 3G and 4G. Such configuration foresaw to share not only cell radio resources but also Cell IDs and TACs, i.e. the same value for a Cell ID/TAC was used by all operators, the cells and Tracking Areas (TAs) could be only distinguished globally, i.e. as Cell Global Identities (CGIs) or Tracking Area Identities (TAIs), with the Public Land Mobile Network (PLMN) ID prefix. This required operators to coordinate those IDs. Multiple Cell ID/TAC cell configuration is able to overcome those restrictions, and broadcast information associated with a single physical cell resource is able to indicate more than one Cell ID/TAC pair, each of which is associated with an operator's network.

The only deployment scenario for the single Cell ID/TAC cell configuration required and supported was the case where the RAN was owned by a single operator and offered to other operators. The resulting architecture was a single RAN connected to several core networks.

The multiple Cell ID/TAC cell configuration offers several possibilities, but the most common is one where several separate operator networks logically operate their own networks. This is very much in line with the intention of this configuration option. Operators have the benefit of configuring and operating their own network, independent from configuration and operating strategies of the networks of the other operators. Actual sharing of physical cell resources would work as for the "classical" MOCN scenarios, where fixed or dynamic quotas would regulate the usage radio resources.

3GPP is currently working on standardization of 5G CN and New Radio (NR) access. In this work there is a lot of focus to support network slicing. Below is a short description of network slicing.

The support for network slicing is an important part of the vision for the 5GS architecture. As stated by different forums, such as Next Generation Mobile Network (NGMN) Alliance, network slicing consists of deploying multiple end-to-end logical networks in support of independent business operations. In contrast to deploying an independent network infrastructure, each instance of a slice (blueprint)

should be possible to realize as a logical network corresponding to a shared infrastructure (including shared processing, storage, transport, radio spectrum, and hardware platforms), where it co-exists with other slices having potentially different characteristics. FIG. 2 depicts an example of multiple slice instances deployed in the same network infrastructure. In this way, the infrastructure and assets utilization will be much more cost and energy efficient, while the logical separation allows for a flexible and independent configuration and management of the slices without compromising stability and security. Enabling slice realization over a common physical infrastructure would of course not prevent the realization of a slice instance by means of dedicated resources and assets.

In 3GPP, the notion of network slicing has also been introduced as a way to address the needs for the different vertical industries, translated into a wide range of use cases for the NG architecture. Network slicing is an end to end concept, where a given network slice could be made up of different dedicated or shared sub-network instances. For example, it is possible to deploy network supporting two slices using a shared RAN sub-network instance used by both slices and two dedicated core network sub-network instances for each slice. In this case, the RAN would have a selection function connecting UEs of one slice to the correct core network instance.

SUMMARY

Systems and methods for redirecting Radio Resource Control (RRC) messages in a wireless system that uses Central Unit (CU)/Distributed Unit (DU) splitting and either network sharing or network slicing are disclosed. Embodiments of a method performed by a shared DU and corresponding embodiments of a network node that implements a shared DU are disclosed. In some embodiments, a method performed by a shared DU for either (a) two or more base stations or (b) two or more network slices for the same base station, where the two or more base stations or the two or more network slices comprise separate CUs and the shared DU comprises shared resources that are shared by the two or more base stations or the two or more network slices, comprises receiving a RRC message from a User Equipment (UE), where the RRC message is an RRC Setup Request message, an RRC Reestablishment Request message, or an RRC Resume Request message. The method further comprises sending a first DU-to-CU message to a first CU from among the CUs of the two or more base stations or the two or more network slices, where the first DU-to-CU message comprises an RRC container that comprises the RRC message. Notably, the phrase "DU-to-CU message" is sometimes used herein to better distinguish a message sent from a DU to a CU from other messages. In some embodiments, the DU-to-CU message is an F1AP message. The method further comprise either obtaining an indication that the first CU is a wrong CU for the RRC message or determining that the first CU is a wrong CU for the RRC message. The method further comprises, upon obtaining the indication that the first CU is a wrong CU for the RRC message or determining that the first CU is a wrong CU for the RRC message, sending another DU-to-CU message to a second CU from among the CUs of the two or more base stations or the two or more network slices, where the another DU-to-CU message comprises an RRC container that comprises the RRC message or a related RRC message related to the RRC message. In this manner, redirection can be performed until the correct CU is reached.

In some embodiments, the method comprises obtaining the indication that the first CU is a wrong CU for the RRC message. Further, in some embodiments, the RRC message is an RRC Setup Request message, and the method further comprises receiving a first CU-to-DU message from the first CU where the first CU-to-DU message comprises an RRC container that comprises an RRC Setup message, sending the RRC Setup message to the UE, and receiving an RRC Setup Complete message from the UE. Notably, the phrase "CU-to-DU message" is sometimes used herein to better distinguish a message sent from a CU to a DU from other messages. In some embodiments, the CU-to-DU message is an F1AP message. Still further, obtaining the indication comprises sending a second DU-to-CU message to the first CU where the second DU-to-CU message comprises an RRC container that comprises the RRC Setup Complete message from the UE and receiving a second CU-to-DU message from the first CU where the second CU-to-DU message comprises information that indicates that the first CU is a wrong CU for the RRC Setup Request message. Further, sending the other DU-to-CU message to the second CU comprises sending a third DU-to-CU message to the second CU where the third DU-to-CU message comprises the RRC Setup Complete message. In some embodiments, the second CU-to-DU message comprises an RRC container that comprises the RRC Setup Complete message. In some embodiments, the second CU-to-DU message is a UE Context Release Command, and the method further comprises sending a UE Context Release Complete message to the first CU.

In some embodiments, the RRC message is an RRC Reestablishment Request message. Further, obtaining the indication comprises receiving a first CU-to-DU message from the first CU, where the first CU-to-DU message comprises information that indicates that the first CU is a wrong CU for the RRC Reestablishment Request message. Sending the other DU-to-CU message to the second CU comprises sending a second DU-to-CU message to the second CU where the second DU-to-CU message comprises the RRC Reestablishment Request message. In some embodiments, the second CU-to-DU message comprises an RRC container that comprises the RRC Reestablishment Request message. In some embodiments, the method further comprises receiving a second CU-to-DU message from the second CU where the second CU-to-DU message comprises an RRC container that comprises an RRC Reestablishment message, sending the RRC Reestablishment message to the UE, receiving an RRC Reestablishment Complete message from the UE, and sending a third DU-to-CU message to the second CU where the third DU-to-CU message comprises an RRC container that comprises the RRC Reestablishment Complete message from the UE.

In some embodiments, the RRC message is an RRC Resume Request message. Obtaining the indication comprises receiving a first CU-to-DU message from the first CU where the first CU-to-DU message comprises information that indicates that the first CU is a wrong CU for the RRC Resume Request message. Sending the other DU-to-CU message to the second CU comprises sending a second DU-to-CU message to the second CU where the second DU-to-CU message comprises the RRC Resume Request message. In some embodiments, the first CU-to-DU message comprises an RRC container that comprises the RRC Resume Request message. In some embodiments, the method further comprises receiving a second CU-to-DU message from the second CU where the second CU-to-DU message comprising an RRC container that comprises an RRC Resume message, sending the RRC Resume message to the UE, receiving an RRC Resume Complete message from the UE, and sending a third DU-to-CU message to the second CU where the third DU-to-CU message comprises an RRC container that comprises the RRC Resume Complete message from the UE.

In some embodiments, the method comprises determining that the first CU is a wrong CU for the RRC message. Further, in some embodiments, the RRC message is an RRC Setup Request message and the method further comprises receiving a first CU-to-DU message from the first CU where the first CU-to-DU message comprises an RRC container that comprises an RRC Setup message, sending the RRC Setup message to the UE, and receiving an RRC Setup Complete message from the UE. Determining that the first CU is a wrong CU for the RRC message from the UE comprises determining that the first CU is a wrong CU for the RRC message from the UE based on either a Public Land Mobile Network (PLMN) indicated by the RRC Setup Complete message or a network slice indicated by the RRC Setup Complete message. Sending the other DU-to-CU message to the second CU comprises sending a third DU-to-CU message to the second CU where the third DU-to-CU message comprises the RRC Setup Complete message from the UE. In some embodiments, the second CU is selected based on either the PLMN indicated by the RRC Setup Complete message or the network slice indicated by the RRC Setup Complete message. In some embodiments, the method further comprises sending a UE Context Release Required message to the first CU, and receiving a UE Context Release Confirm message from the first CU.

In some embodiments, the RRC message is an RRC Resume Request message. Determining that the first CU is a wrong CU for the RRC message from the UE comprises determining that the first CU is a wrong CU for the RRC message from the UE based on a MSG3 in a random access procedure performed for the UE in association with the RRC Resume Request message. Sending the other DU-to-CU message to the second CU comprises sending a second DU-to-CU message to the second CU where the second DU-to-CU message comprises the RRC Resume Request message. In some embodiments, the method further comprises receiving a second CU-to-DU message from the second CU where the second CU-to-DU message comprises an RRC container that comprises an RRC Resume message, sending the RRC Resume message to the UE, receiving an RRC Resume Complete message from the UE, and sending a third DU-to-CU message to the second CU where the third DU-to-CU message comprising an RRC container that comprises the RRC Resume Complete message from the UE.

In some embodiments, a network node that implements a shared DU for either (a) two or more base stations or (b) two or more network slices for the same base station, where the two or more base stations or the two or more network slices comprise separate CUs and the shared DU comprises shared resources that are shared by the two or more base stations or the two or more network slices, is adapted to receive an RRC message from a UE, where the RRC message is an RRC Setup Request message, an RRC Reestablishment Request message, or an RRC Resume Request message. The network node is further adapted to send a first DU-to-CU message to a first CU from among the CUs of the two or more base stations or the two or more network slices, where the first DU-to-CU message comprises an RRC container that comprises the RRC message. The network node is further adapted to either obtain an indication that the first CU is a wrong CU for the RRC message or determine that the first CU is a wrong CU for the RRC message. The network node is further adapted to, upon obtaining the indication that the first CU is a wrong CU for the RRC message or determining that the first CU is a wrong CU for the RRC message, sending another DU-to-CU message to a second CU from among the CUs of the two or more base stations or the two or more network slices, where the other DU-to-CU message comprises an RRC container that comprises the RRC message or a related RRC message related to the RRC message.

Embodiments of a method performed by a CU and corresponding embodiments of a network node implementing a CU are disclosed. In some embodiments, a method performed by a CU of a base station having a split between a CU and one or more DUs comprises receiving a first DU-to-CU message from a shared DU for two or more CUs. The first DU-to-CU message comprises a RRC message from a UE. The RRC message is an RRC Setup Request message, an RRC Reestablishment Request message, or an RRC Resume Request message. The method further comprises determining that a PLMN or network slice indicated for the RRC message is not served by the CU and, in response, sending a first CU-to-DU message to the shared DU, where the first CU-to-DU message comprises information that indicates that the CU is the wrong CU for the RRC message.

In some embodiments, the first DU-to-CU message further comprises an RRC container that comprises the RRC message. In some embodiments, the first DU-to-CU message further comprises information that indicates the PLMN or network slice indicated for the RRC message.

In some embodiments, a network node that implements a CU of a base station having a CU/DU split is adapted to receive a first DU-to-CU message from a shared DU for two or more CUs. The first DU-to-CU message comprises a RRC message from a UE. The RRC message is an RRC Setup Request message, an RRC Reestablishment Request message, or an RRC Resume Request message. The network node is further adapted to determine that a PLMN or network slice indicated for the RRC message is not served by the CU and, in response, sending a first CU-to-DU message to the shared DU, where the first CU-to-DU message comprises information that indicates that the CU is the wrong CU for the RRC message.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

There currently exist certain challenges with respect to network sharing in the current Next Generation (NG) Radio Access Network (RAN) (i.e., NG-RAN) architecture. It could be beneficial to combine network sharing scenarios using multiple Cell Identity (ID)/Tracking Area Code (TAC) cell configuration with NG Node B (gNB) Central Unit (CU)/Distributed Unit (DU) split deployments. In this case, deployments may keep the possibility of separating CUs (also referred to herein as gNB-CUs) geographically from each other. Thus, it cannot be always assumed that CUs that operate in network sharing would be able to exchange data easily due to their geographical separation, not to speak of security issues in doing so. However, it can be assumed that a single physical DU (also referred to herein as a gNB-DU) will be deployed in such scenarios, such that at least the Physical (PHY) layer and Medium Access Control (MAC) layer would need to be a common resource, with implementation specific means to follow quotas negotiated among sharing partners.

Figure 1:
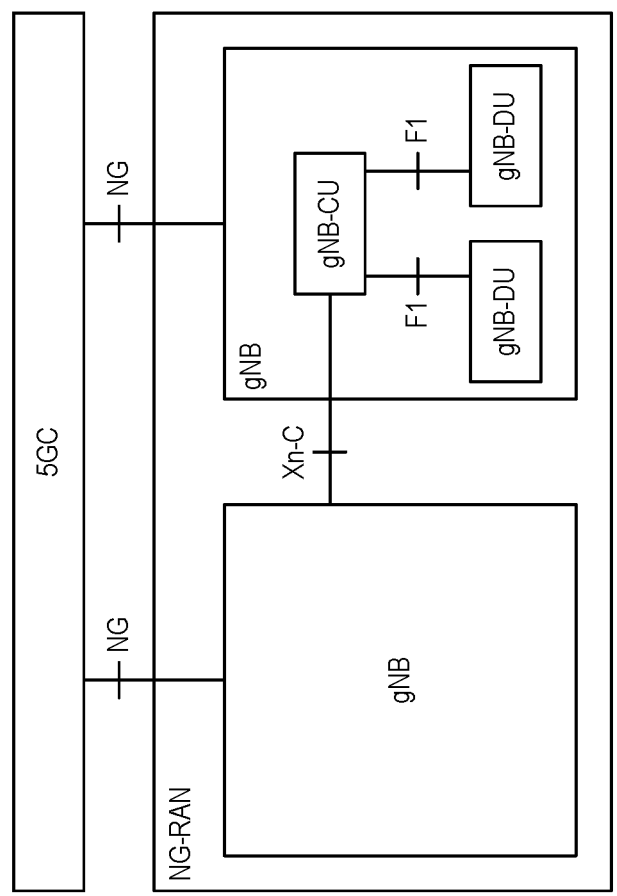
FIG. 1 depicts the current Fifth Generation (5G) Radio Access Network (RAN) architecture (also referred to as the Next Generation (NG) RAN, or NG-RAN), as described in Third Generation Partnership Project (3GPP) Technical Specification (TS) 38.401 (see e.g., V15.3.0)
Figure 2:
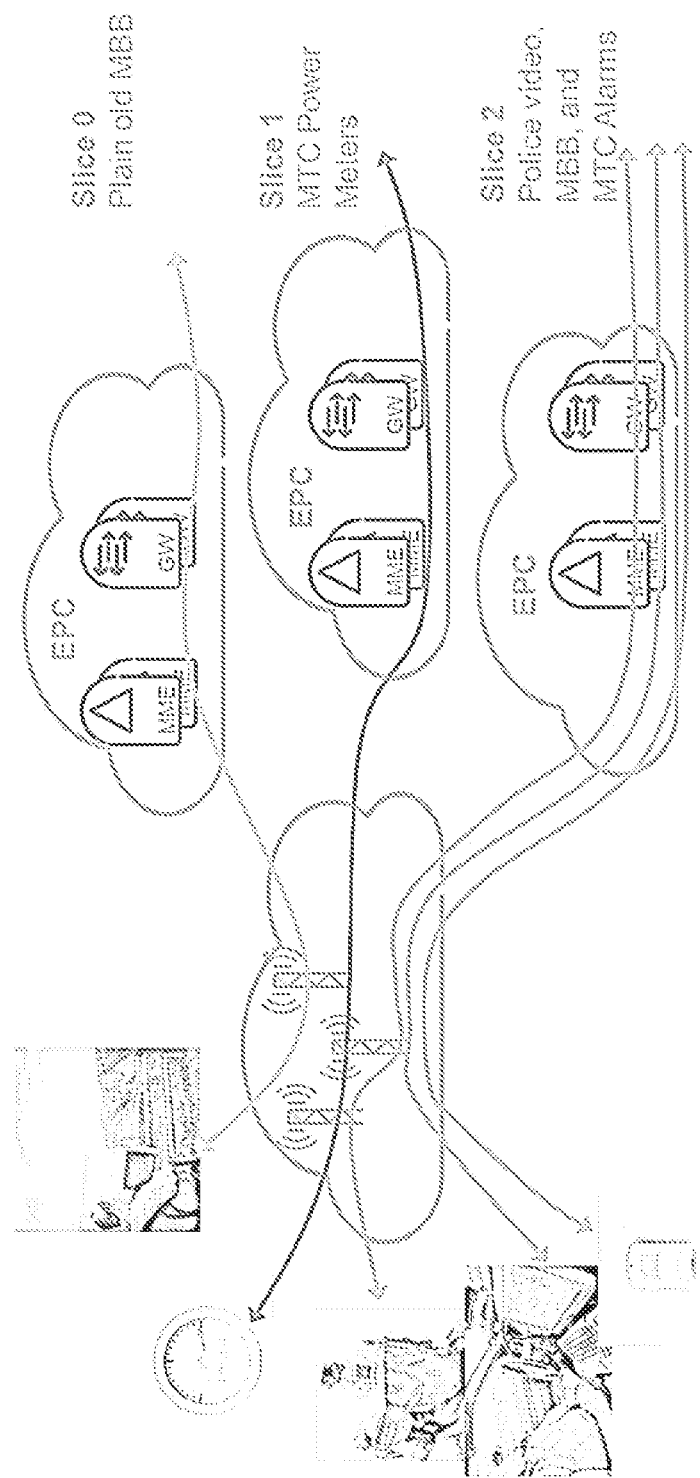
FIG. 2 depicts an example of multiple slice instances deployed in the same network infrastructure.
Figure 3:
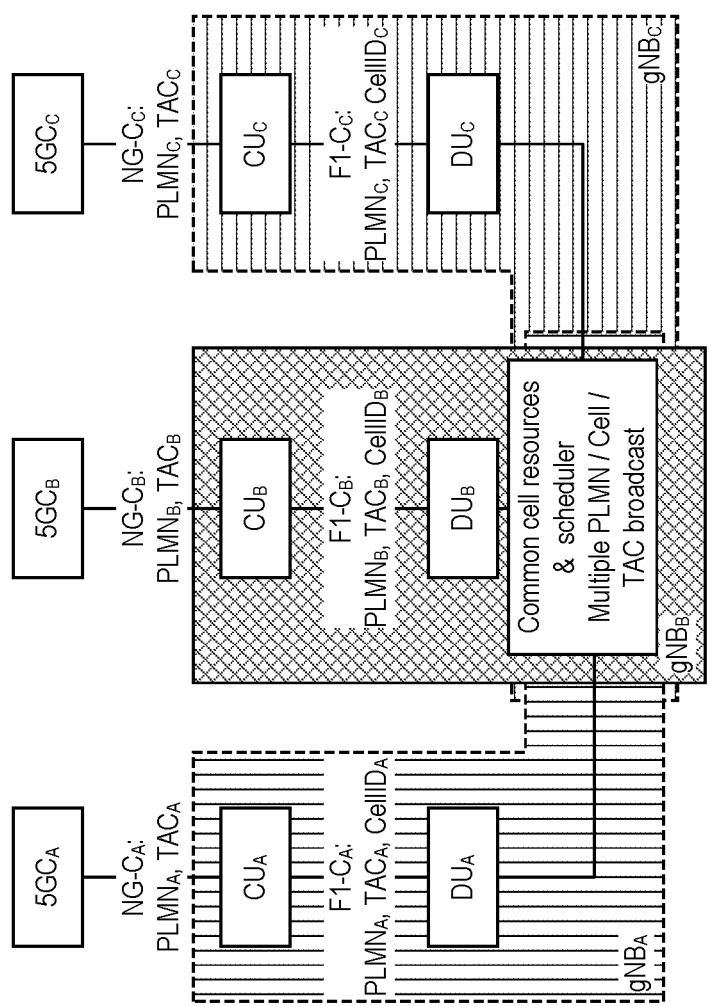
FIG. 3 shows a deployment with separate NG Node B (gNB) Central Units (gNB-CUs) along with logical Public Land Mobile Network (PLMN) specific gNB Distributed Units (gNB-DUs) and a common Physical (PHY) layer/ Medium Access Control (MAC) layer box, where the gNB-DUs and the common PHY/MAC box are in one physical entity and the gNB-CUs are separate from each other.

FIG. 3 shows such a deployment with separate gNB-CUs. It is assumed that the logical Public Land Mobile Network (PLMN) specific gNB-DUs and the common PHY/MAC box, schematically shown, are in one physical entity, whereas gNB-CUs are separate from each other. It is also shown that one PLMN specific gNB-CU and gNB-DU and the PHY/MAC entity form one logical gNB. In other words, in the example of FIG. 3, there are three PLMNs, which are denoted as $PLMN_A$, $PLMN_B$, and $PLMN_C$. $PLMN_A$, $PLMN_B$, and $PLMN_C$ have respective logical gNBs, which are denoted as $gNB_A$, $gNB_B$, and $gNB_C$, connected to respective Fifth Generation Core networks (5GCs), which are denoted as $5GC_A$, $5GC_B$, and $5GC_C$. As illustrated, the three logical gNBs have respective TACs, denoted as $TAC_A$, $TAC_B$, and $TAC_C$, and respective cell IDs, denoted as $CellID_A$, $CellID_B$, and $CellID_C$. The three logical gNBs include separate gNB-CUs, which are denoted as $CU_A$, $CU_B$, and $CU_C$, having respective F1 interfaces to respective gNB-DUs, which are denoted as $DU_A$, $DU_B$, and $DU_C$. The gNB-DUs share common cell resources and schedulers (e.g., common PHY and MAC). Note that the entity that includes the gNB-DUs and the shared PHY and MAC resources is referred to herein as a "shared gNB-DU," which is sometimes denoted as, e.g., $gNB-DU_{A/B/C}$. In general, it can also be assumed that the PLMN specific gNB-CUs are not inter-connected, nor are the 5GC nodes.

In the deployment scenario in FIG. 3, each gNB-CU serves a specific PLMN (or a subset of PLMNs). This deployment scenario is not fully supported by the current Third Generation Partnership (3GPP) specifications. Specifically, there is no proper support for the following procedures.

1. Initial Attach: At initial attach, after performing a successful random access, the UE sends a Radio Resource Control (RRC) Setup Request message to the gNB-DU. The gNB-DU should then select the correct gNB-CU for the UE, i.e. a gNB-CU that serves the PLMN selected by the UE. However, the RRC Setup Request message does not include a PLMN ID. Therefore, the gNB-DU may select the wrong gNB-CU, i.e. a gNB-CU that does not serve the PLMN selected by the UE. The UE will later send an RRC Setup Complete message, including the selected PLMN ID, to the gNB-DU. At this point, the selection of the wrong gNB-CU could lead to one of the following scenarios:
   a. If the gNB-DU is not able to read the content of the RRC Setup Complete message, the gNB-DU will send the RRC Setup Complete message to the wrong gNB-CU. The gNB-CU will realize the error when reading the PLMN ID in the RRC Setup Complete message. At this point, the gNB-CU has no choice other than to reject the RRC connection and trigger a failure of the Initial Attach procedure. After the Initial Attach procedure has failed, the UE can try again, but with no guarantee of a better outcome.
   b. If the gNB-DU is able to read the content of the RRC Setup Complete message, the gNB-DU will send the RRC Setup Complete to the correct gNB-CU and the Initial Attach procedure may continue successfully. However, the signaling connection toward the wrong gNB-CU would be kept hanging, unless the gNB-DU takes proper actions to remove it.
2. RRC Reestablishment: At RRC Reestablishment, the UE sends an RRC Reestablishment Request message to the gNB-DU. The gNB-DU is then supposed to select the correct gNB-CU for the UE (e.g., a gNB-CU that serves the PLMN selected by the UE). However, the RRC Reestablishment Request message does not include a PLMN ID. Therefore, the gNB-DU may send the RRC Reestablishment Request message to the wrong gNB-CU (e.g., a gNB-CU that does not serve the PLMN selected by the UE). The wrong gNB-CU will then try to retrieve the UE context, but it will inevitably fail. The wrong gNB-CU will then try to send an RRC Setup message to the UE (e.g., it will fail the RRC Reestablishment procedure and revert to an Initial Attach procedure). However, the Initial Attach procedure will subsequently fail for the same reasons explained above in point 1.

3. RRC Resume: At RRC Resume, the UE sends an RRC Resume Request message to the gNB-DU. The RRC Resume Request message includes the Inactive Radio Network Temporary Identifier (I-RNTI) that may include PLMN information. However, the gNB-DU may not be able to process the content of the RRC Resume Request message, as this depends on the gNB-DU implementation. If the gNB-DU is not able to process the RRC Resume Request message, it may select the wrong gNB-CU (e.g., a gNB-CU that does not serve the PLMN selected by the UE). In this case, the same problem as described in point 2 above arises. This means that the wrong gNB-CU will try to retrieve the UE context and will inevitably fail. This will lead to reverting to an Initial Attach procedure that will also fail.

Figure 4:
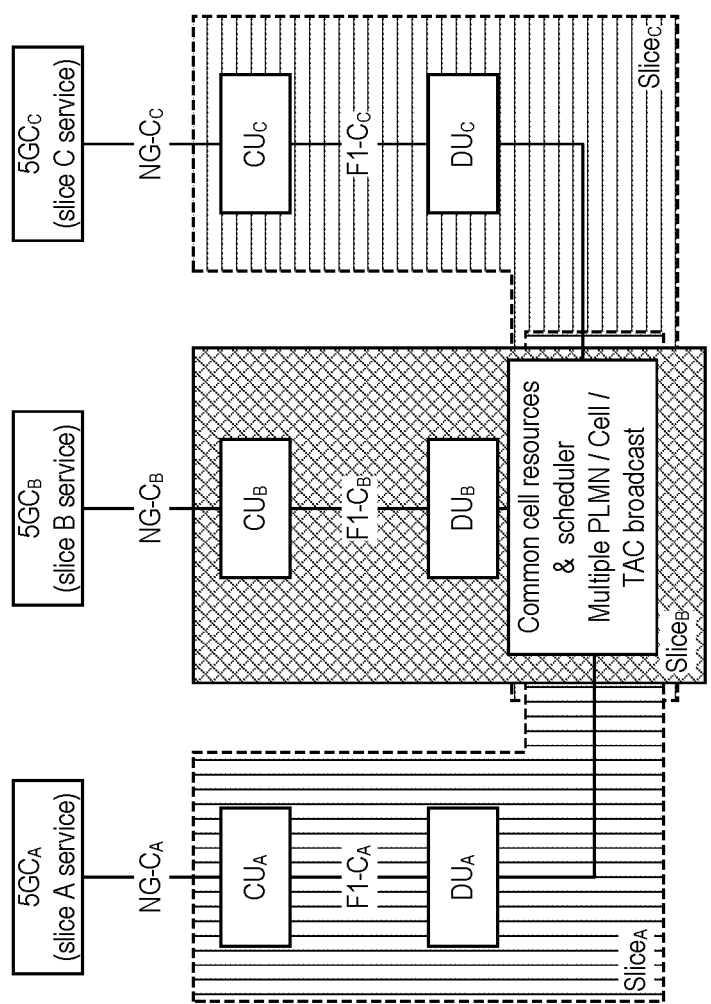
FIG. 4 illustrates an example of deployment scenario with multiple intra-operator gNB-CUs and gNB-DUs sharing the same physical resources and serving different slices.

The problem above is also valid in other cases where the operator wants to support multiple gNB-CUs. For example, a similar problem may arise in deployments using network slices where different core network instances are deployed for different end-to-end slices and there is a desire to deploy different gNB-CU instances for each slice possibly co-located with the core network instance. In this case, the slices can utilize the same physical (hardware/software) resources. An example of such scenario is depicted in FIG. 4. FIG. 4 illustrates an example of deployment scenario with multiple intra-operator gNB-CUs and gNB-DUs sharing the same physical resources and serving different slices. In other words, in the example of FIG. 4, there are three slices, which are denoted as slice A, slice B, and slice C, and corresponding logical gNBs, which are denoted as $gNB_A$, $gNB_B$, and $gNB_C$, connected to respective 5GC instances, which are denoted as $5GC_A$, $5GC_B$, and $5GC_C$. As illustrated, the three logical gNBs include separate gNB-CUs, which are denoted as $CU_A$, $CU_B$, and $CU_C$, having respective F1 interfaces to respective gNB-DUs, which are denoted as $DU_A$, $DU_B$, and $DU_C$. The gNB-DUs share common cell resources and scheduler (e.g., common PHY and MAC).

In this case, instead of PLMN ID, the UE would use a slice ID or a slice selection assistance information (Single Network Slice Selection Assistance Information (S-NSSAI)) as shown below:

1. Initial Attach: At initial attach, after performing a successful random access, the UE sends an RRC Setup Request message to the gNB-DU. The gNB-DU is then supposed to select the correct gNB-CU for the UE (e.g., a gNB-CU that serves the Slice selected by the UE). However, the RRC Setup Request message does not include a Slice ID (or S-NSSAI). Therefore, the gNB-DU may select the wrong gNB-CU (e.g., a gNB-CU that does not serve the Slice selected by the UE). The UE will later send an RRC Setup Complete message, including the selected Slice ID (S-NSSAI), to the gNB-DU. At this point, the selection of the wrong gNB-CU could lead to one of the following scenarios:
   a. If the gNB-DU is not able to read the content of the RRC Setup Complete message, the gNB-DU will send the RRC Setup Complete message to the wrong gNB-CU. The gNB-CU will realize the error when reading the Slice ID in the RRC Setup Complete message. At this point, the gNB-CU has no choice other than rejecting the RRC connection and failing the Initial Attach procedure. After the Initial Attach procedure has failed, the UE can try again, but with no guarantee of a better outcome.
   b. If the gNB-DU is able to read the content of the RRC Setup Complete message, the gNB-DU will send the RRC Setup Complete to the correct gNB-CU and the Initial Attach procedure may continue successfully. However, the signaling connection toward the wrong gNB-CU would be kept hanging, unless the gNB-DU takes proper actions to remove it.

2. RRC Reestablishment: At RRC Reestablishment, the UE sends an RRC Reestablishment Request message to the gNB-DU. The gNB-DU is then supposed to select the correct gNB-CU for the UE (e.g., a gNB-CU that serves the Slice selected by the UE). However, the RRC Reestablishment Request message does not include a Slice ID. Therefore, the gNB-DU may send the RRC Reestablishment Request message to the wrong gNB-CU (e.g., a gNB-CU that does not serve the Slice selected by the UE). The wrong gNB-CU will then try to retrieve the UE context, but it will inevitably fail. The wrong gNB-CU will then try to send an RRC Setup message to the UE (e.g., it will fail the RRC Reestablishment procedure and revert to an Initial Attach procedure). However, the Initial Attach procedure will subsequently fail for the same reasons explained in point 1 above.

3. RRC Resume: At RRC Resume, the UE sends an RRC Resume Request message to the gNB-DU. The RRC Resume Request message includes the I-RNTI that may include Slice information. However, the gNB-DU may not be able to process the content of the RRC Resume Request message, as this depends on the gNB-DU implementation. If the gNB-DU is not able to process the RRC Resume Request message it may select the wrong gNB-CU (e.g., a gNB-CU that does not serve the Slice selected by the UE). In this case, the same problem as described in point 2 above arises, meaning that the wrong gNB-CU will try to retrieve the UE context and inevitably fail. This will lead to reverting to an Initial Attach procedure that will also fail.

Certain aspects of the present disclosure and their embodiments may provide solutions to these or other challenges. To solve the problems with the Initial Attach procedure, the following solutions are proposed. The problem described in point 1(a) above with respect to FIG. 3 (for multiple operators) and FIG. 4 (for a single operator and multiple slices) can be solved as follows. After realizing the error, the gNB-CU sends an F1 Application Protocol (F1AP) message (e.g., UE Context Release Command) with a special indication that informs the gNB-DU about the error in the gNB-CU selection. The gNB-CU could include additional assistance information for supporting a new gNB-CU selection (e.g., PLMN ID or Slice ID selected by the UE, the RRC Setup Completed message as provided by the UE). The gNB-DU then performs another gNB-CU selection until it finds the correct gNB-CU (e.g., the one that served the PLMN or Slice selected by the UE).

The problem described in point 1(b) with respect to FIGS. 3 and 4 can be solved as follows. After sending the RRC Setup Complete to the correct gNB-CU, the gNB-DU will send an F1AP message requesting the release of the signaling connection to the wrong gNB-CU (e.g., UE Context Release Request). The message may include a special indication to provide the reason for the release request.

To solve the problem with the RRC Reestablishment procedure, the following solution is proposed. After failing to retrieve the UE context, the wrong gNB-CU sends the RRC Setup together with a special indication that informs the gNB-DU that the UE context retrieval failed. For example, the special indication can be added in the F1AP downlink RRC Message Transfer message. The gNB-DU can then try to contact a different gNB-CU until the UE context is successfully found. In this way, the RRC Reestablishment procedure can succeed. Additionally, an indication that the UE Context was found can also be added so that the gNB-DU is explicitly informed that a reestablishment procedure is ongoing and that the UE context has been retrieved.

To solve the problem with the RRC Resume procedure, the following solution is proposed. A similar solution as the one described for RRC Reestablishment can be adopted. In this case, the gNB-CU can also provide some additional assistance information for gNB-CU selection, such as PLMN ID or Slice ID and the RRC Resume message (as sent by the UE).

Certain embodiments may provide one or more of the following technical advantage(s). The proposed solutions allow for support of network sharing and/or network slicing with a CU-DU split, where different logical CUs and DUs share the same physical radio resources (see FIG. 3).

Solutions 1A and 1B: Initial Attach Procedure

Figure 5A:
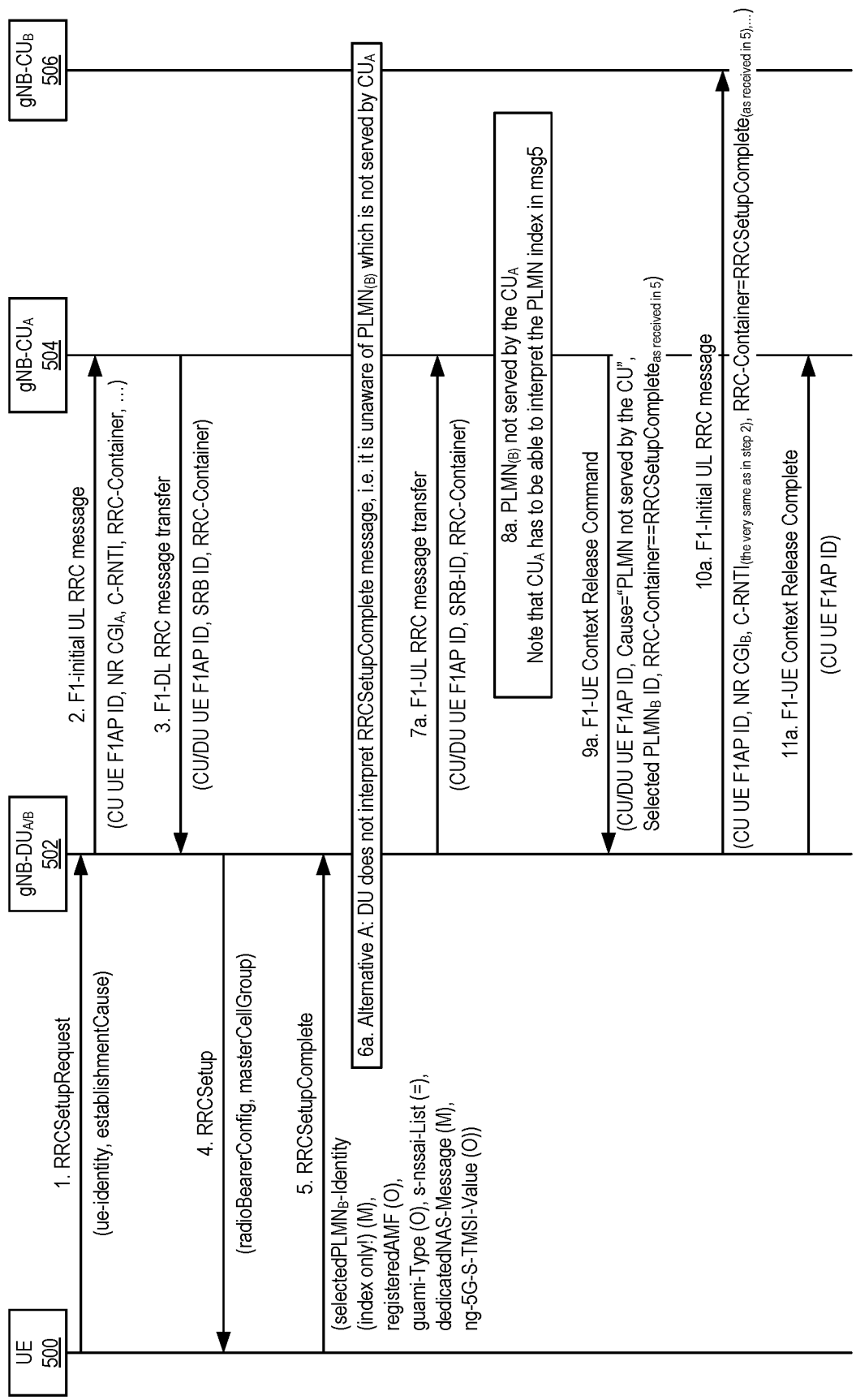
FIGS. 5A and 5B show an Initial Attach procedure (including F1 messaging) in case of a Central Unit (CU)—Distributed Unit (DU) split with network sharing in accordance with some embodiments of the present disclosure.
Figure 5B:
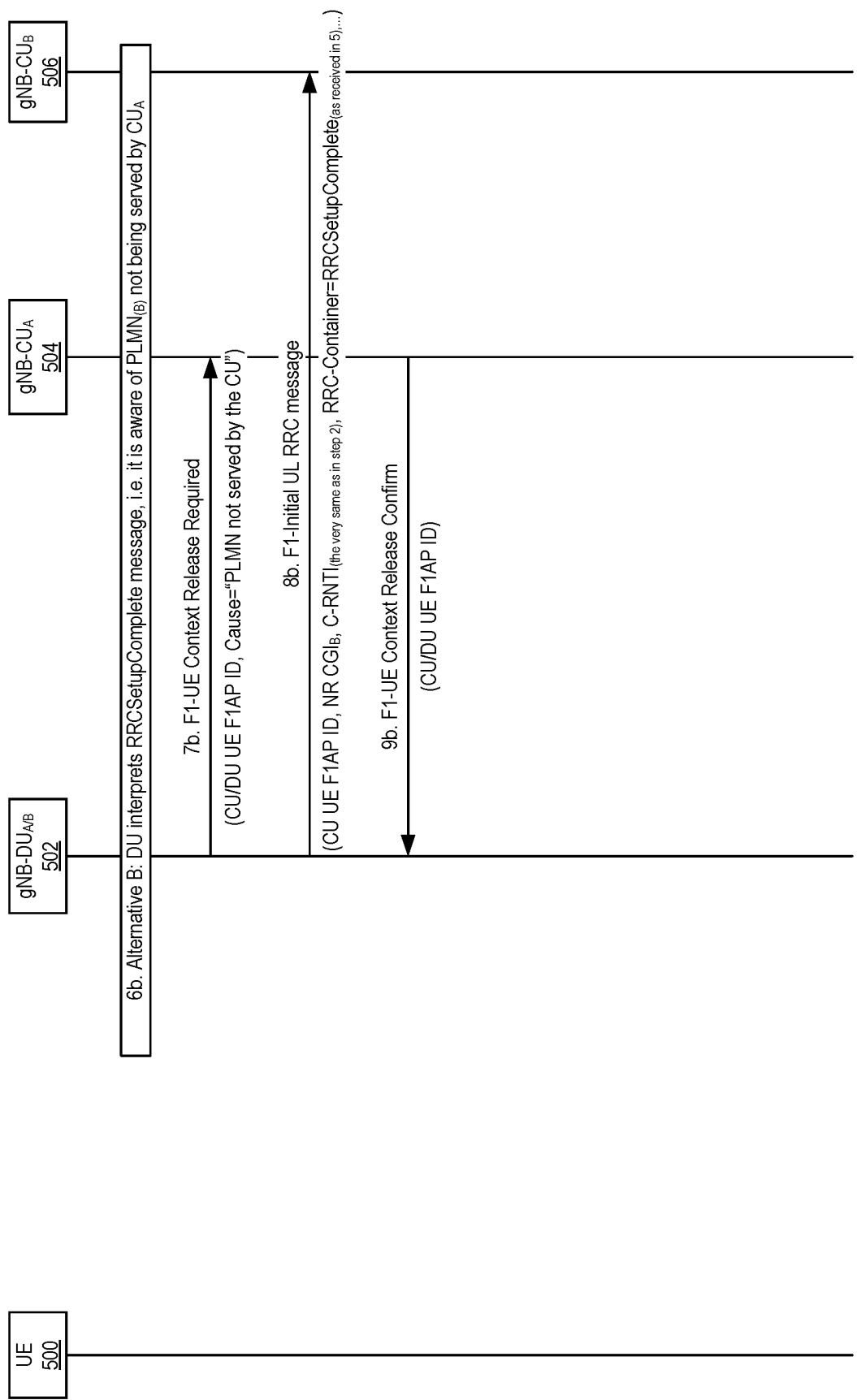

FIGS. 5A and 5B show an Initial Attach procedure (including F1 messaging) in case of a CU-DU split with network sharing in accordance with some embodiments of the present disclosure. Here, the Initial Attach procedure is described with respect to a UE 500 and an implementation of at least two gNBs using network sharing and CU/DU splitting, e.g., as described above with respect to FIG. 3. In this example, the architecture includes two (logical) gNBs, denoted $gNB_A$ and $gNB_B$, including a shared gNB-DU (gNB implementation for both $gNB_A$ and $gNB_B$ using shared resources), which is denoted as $gNB-DU_{A/B}$ 502, and separate gNB-CUs, denoted as $gNB-CU_A$ 504 and $gNB-CU_B$ 506. The steps of FIGS. 5A and 5B are as follows:

Step 1: The UE 500 sends an RRC Setup Request message to the $gNB-DU_{A/B}$ 502.

Step 2: The $gNB-DU_{A/B}$ 502 sends an F1 initial uplink RRC message to one of the gNB-CUs, which in this example is the $gNB-CU_A$ 504. As described in 3GPP Technical Specification (TS) 38.473 V15.6.0, the F1 initial uplink RRC message includes an F1AP ID, a NG-RAN Cell Global Identifier (NR CGI) of the UE 500 for $gNB_A$ (denoted as $NR\ CGI_A$), a Cell Radio Network Temporary Identifier (C-RNTI) allocated for the UE 500 at the $gNB-DU_{A/B}$ 502, and an RRC container that, in this case, includes the RRC Setup Request message from Step 1.

Step 3: The $gNB-CU_A$ 504 returns an F1 downlink RRC message transfer to the $gNB-DU_{A/B}$ 502. As described in 3GPP TS 38.473 V15.6.0, the F1 downlink RRC message transfer includes a Signaling Radio Bearer (SRB) ID and an RRC container that includes an RRC Setup message.

Step 4: The $gNB-DU_{A/B}$ 502 forwards the RRC Setup message included in the F1 downlink RRC message received from the $gNB-CU_A$ 504 to the UE 500.

Step 5: The UE 500 sends an RRC Setup Complete message to the $gNB-DU_{A/B}$ 502. The RRC Setup Complete message includes, in this example, the PLMN ID of the $gNB_B$, which is denoted as $PLMN_B$-Identity.

Alternative A:

Step 6a: As illustrated in FIG. 5A, at Step 6a the $gNB-DU_{A/B}$ 502 does not interpret the RRC Setup Complete message and is therefore unaware of the error in the gNB-CU. In other words, the $gNB-DU_{A/B}$ 502 does not read the PLMN ID contained in the RRC Setup Complete message and is therefore unaware that the UE 500 has selected the PLMN of $gNB_B$ and, therefore, is also unaware that the $gNB-CU_A$ 504 is the wrong gNB-CU to have sent the RRC Setup Request to in step 1.

Step 7a: Thus, at Step 7a, the $gNB-DU_{A/B}$ 502 sends an F1 RRC message transfer to the $gNB-CU_A$ 504. The RRC message transfer includes an RRC container that, in this example, includes the RRC Setup Complete message received by the $gNB-DU_{A/B}$ 502 in Step 5.

Step 8a: At Step 8a, the $gNB-CU_A$ 504 recognizes the error (e.g., that the PLMN identified in the RRC Setup Complete message is not served by the $gNB-CU_A$ 504).

Step 9a: At Step 9a, the $gNB-CU_A$ 504 sends a UE Context Release Command with a special indication that informs the $gNB-DU_{A/B}$ 502 that the PLMN (i.e., the PLMN identified in the RRC Setup Complete message) is not served by the $gNB-CU_A$ 504. The $gNB-CU_A$ 504 can also include a PLMN ID and/or the RRC Setup Complete message as provided by the UE 500 in order to support a new gNB-CU selection.

Step 10a: At Step 10a the $gNB-DU_{A/B}$ 502 then performs another gNB-CU selection until it finds the correct gNB-CU (e.g., the one that served the PLMN selected by the UE). In other words, the $gNB-DU_{A/B}$ 502 performs a gNB-CU selection to select a different gNB-CU based on, e.g., the PLMN ID included in the RRC Setup Complete message provided by the $gNB-CU_A$ 504 in the UE Context Release Command of Step 9a. In this example, the $gNB-DU_{A/B}$ 502 selects the $gNB-CU_B$ 506, which is the correct gNB-CU (i.e., the gNB-CU for the selected PLMN ID included in the RRC Setup Complete), and sends an F1 initial uplink RRC message to the selected $gNB-CU_B$ 506. The initial uplink RRC message includes an RRC container which, in this example, includes the RRC Setup Complete message.

Step 11a: At Step 11a, the $gNB-DU_{A/B}$ 502 confirms to the $gNB-CU_A$ 504 that the Context Release is complete.

Alternative B:

Step 6b: Alternatively, at Step 6b, the $gNB-DU_{A/B}$ 502 interprets the RRC Setup Complete message and is therefore aware of the error in the gNB-CU (e.g., that the PLMN is not served by the $gNB-CU_A$ 504). In other words, the $gNB-DU_{A/B}$ 502 reads the PLMN ID contained in the RRC Setup Complete message and is therefore aware that the UE 500 has selected the PLMN of $gNB_B$ and, therefore, is also aware that the $gNB-CU_A$ 504 is the wrong gNB-CU to have sent the RRC Setup Request to in Step 1.

Step 7b: Thus, at Step 7b the $gNB-DU_{A/B}$ 502 sends a UE Context Release Required message with a special indication that informs the $gNB-CU_A$ 504 that the PLMN is not served by the $gNB-CU_A$ 504.

Step 8b: At Step 8b, the gNB-DU$_{A/B}$ 502 then performs another gNB-CU selection until it finds the correct gNB-CU (e.g., the one that served the PLMN selected by the UE 500). In this example, the gNB-DU$_{A/B}$ 502 selects the gNB-CU$_B$ 506, which is the correct gNB-CU (i.e., the gNB-CU for the selected PLMN ID included in the RRC Setup Complete), and sends an F1 initial uplink RRC message to the selected gNB-CU$_B$ 506. The initial uplink RRC message includes an RRC container which, in this example, includes the RRC Setup Complete message.

Step 9b: At Step 9b, the gNB-CU$_A$ 504 confirms to the gNB-DU$_{A/B}$ 502 that the Context Release is complete.

Figure 6A:
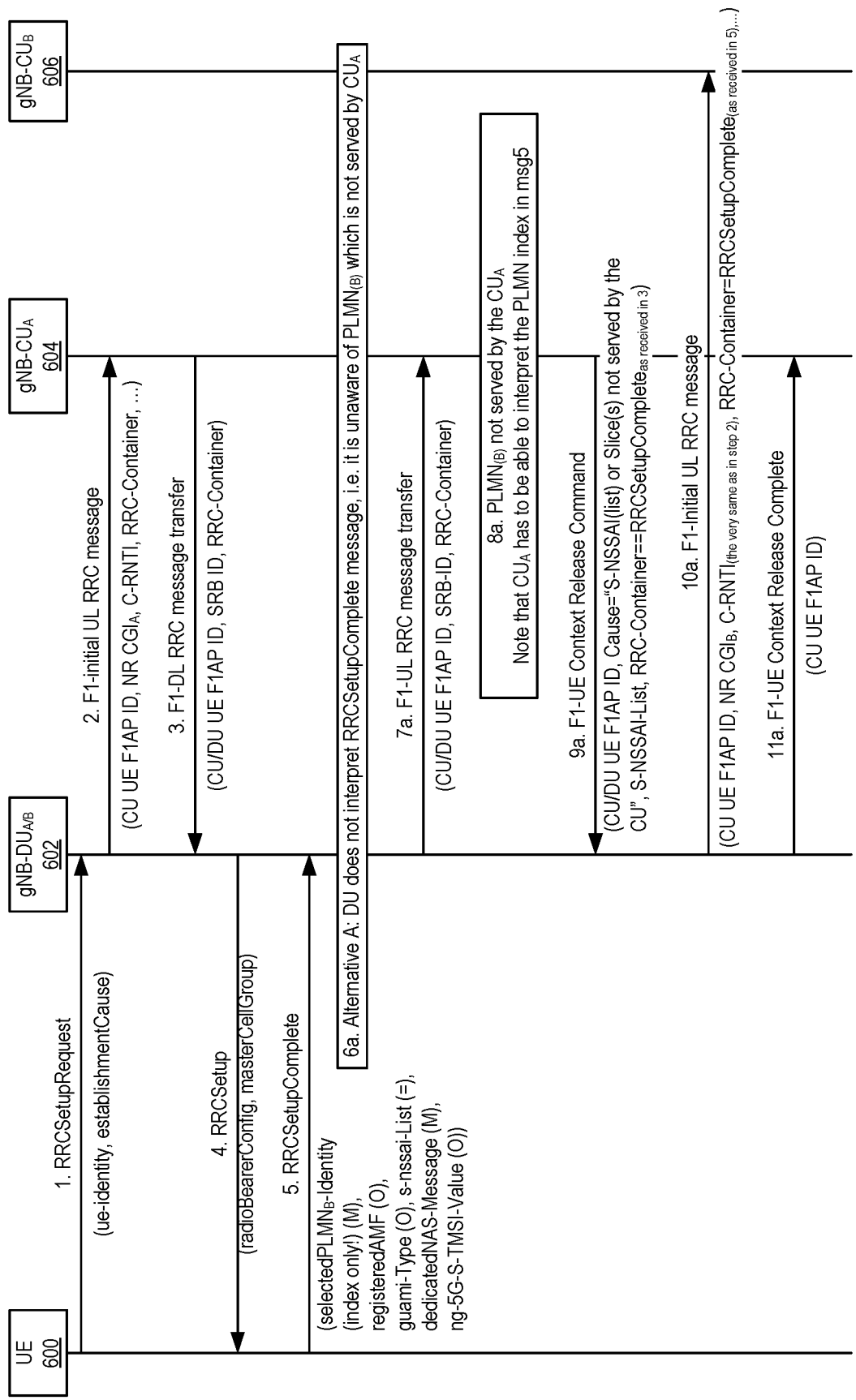
FIGS. 6A and 6B show the corresponding messaging flow in case of a CU-DU split with network slicing, in accordance with another embodiment of the present disclosure.
Figure 6B:
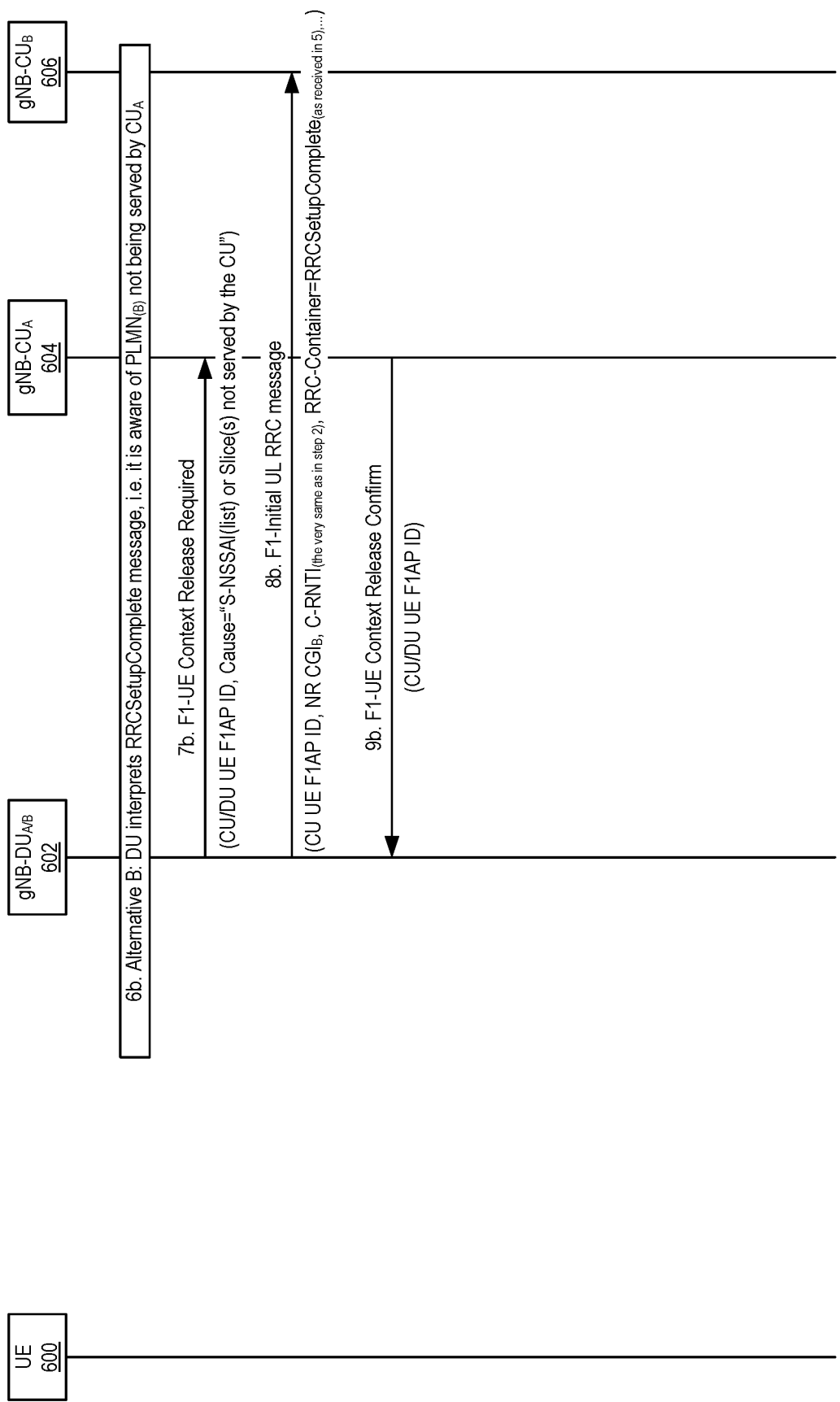

FIGS. 6A and 6B show the corresponding messaging flow in case of a CU-DU split with network slicing in accordance with another embodiment of the present disclosure. Here, the Initial Attach procedure is described with respect to a UE 600 and an implementation of at least two gNBs using network slicing and CU/DU splitting, e.g., as described above with respect to FIG. 4. In this example, the architecture includes two (logical) gNBs, denoted gNB$_A$ and gNB$_B$, including a shared gNB-DU (gNB implementation for both gNB$_A$ and gNB$_B$ using shared resources), which is denoted as gNB-DU$_{A/B}$ 602, and separate gNB-CUs, denoted as gNB-CU$_A$ 604 and gNB-CU$_B$ 606 for respective network slices. The steps of the process of FIGS. 6A and 6B are as follows:

Step 1: The UE 600 sends an RRC Setup Request message to the gNB-DU$_{A/B}$ 602.

Step 2: The gNB-DU$_{A/B}$ 602 sends an F1 initial uplink RRC message to one of the gNB-CUs, which in this example is the gNB-CU$_A$ 604. As described in 3GPP TS 38.473 V15.6.0, the F1 initial uplink RRC message includes an F1AP ID, a NR CGI of UE 600 for gNB$_A$ (denoted as NR CGI$_A$), a C-RNTI allocated for the UE 600 at the gNB-DU$_{A/B}$ 602, and an RRC container that, in this case, includes the RRC Setup Request message from Step 1.

Step 3: The gNB-CU$_A$ 604 returns an F1 downlink RRC message transfer to the gNB-DU$_{A/B}$ 602. As described in 3GPP TS 38.473 V15.6.0, the F1 downlink RRC message transfer includes a SRB ID and an RRC container that includes an RRC Setup message.

Step 4: The gNB-DU$_{A/B}$ 602 forwards the RRC Setup message included in the F1 downlink RRC message received from the gNB-CU$_A$ 604 to the UE 600.

Step 5: The UE 600 sends an RRC Setup Complete message to the gNB-DU$_{A/B}$ 602. The RRC Setup Complete message includes, in this example, a S-NSSAI (list) or slice(s) selected by the UE 600.

Alternative A:

Step 6a: As illustrated in FIG. 6A, at Step 6a, the gNB-DU$_{A/B}$ 602 does not interpret the RRC Setup Complete message and is therefore unaware of the error in the gNB-CU. In other words, the gNB-DU$_{A/B}$ 602 does not read the S-NSSAI (list) or slice(s) contained in the RRC Setup Complete message and is therefore unware that the UE 600 has selected the S-NSSAI(s) or slice(s) of gN B$_B$ and, therefore, is also unaware that the gNB-CU$_A$ 504 is the wrong gNB-CU to have sent the RRC Setup Request to in Step 1.

Step 7a: Thus, at Step 7a the gNB-DU$_{A/B}$ 602 sends an F1 RRC message transfer to the gNB-CU$_A$ 604. The RRC message transfer includes an RRC container that, in this example, includes the RRC Setup Complete message received by the gNB-DU$_{A/B}$ 602 in Step 5.

Step 8a: At Step 8a, the gNB-CU recognizes the error (e.g., that the S-NSSAI(s) or slice(s) identified in the RRC Setup Complete message is not served by the gNB-CU$_A$ 604).

Step 9a: At Step 9a, the gNB-CU$_A$ 604 sends a UE Context Release Command with a special indication that informs the gNB-DU$_{A/B}$ 602 that the S-NSSAI (list) or slice(s) are not served by the gNB-CU$_A$ 604. The gNB-CU$_A$ 604 can also include a slice ID (e.g., S-NSSAI-List) and/or the RRC Setup Completed message as provided by the UE 600 in order to support a new gNB-CU selection.

Step 10a: At Step 10a, the gNB-DU$_{A/B}$ 602 then performs another gNB-CU selection until it finds the correct gNB-CU (e.g., the one that served the S-NSSAI(s) or slice(s) selected by the UE 600). In other words, the gNB-DU$_{A/B}$ 602 performs a gNB-CU selection to select a different gNB-CU based on, e.g., the S-NSSAI(s) or slice(s) identified in the RRC Setup Complete message provided by the gNB-CU$_A$ 604 in the UE Context Release Command of Step 9a. In this example, the gNB-DU$_{A/B}$ 602 selects the gNB-CU$_B$ 606, which is the correct gNB-CU (i.e., the gNB-CU for the selected S-NSSAI(s) or slice(s) indicated in the RRC Setup Complete), and sends an F1 initial uplink RRC message to the selected gNB-CU$_B$ 606. The initial uplink RRC message includes an RRC container which, in this example, includes the RRC Setup Complete message.

Step 11a: At Step 11a, the gNB-DU$_{A/B}$ 602 confirms to the gNB-CU$_A$ 604 that the Context Release is complete.

Alternative B:

Step 6b: Alternatively, at Step 6b, the gNB-DU$_{A/B}$ 602 interprets the RRC Setup Complete message and is therefore aware of the error in the gNB-CU (e.g., that the S-NSSAI(s) or slice(s) is not served by the gNB-CU$_A$ 604). In other words, the gNB-DU$_{A/B}$ 602 reads the S-NSSAI(s) or slice(s) indicated in the RRC Setup Complete message and is therefore aware that the UE 600 has selected the S-NSSAI(s) or slice(s) of gNB$_B$ and, therefore, that the gNB-CU$_A$ 604 is the wrong gNB-CU to have sent the RRC Setup Request to in Step 1.

Step 7b: Thus, at Step 7b, the gNB-DU$_{A/B}$ 602 sends a UE Context Release Required message with a special indication that informs the gNB-CU$_A$ 604 that the S-NSSAI (list) or slice(s) are not served by the gNB-CU$_A$ 604.

Step 8b: At Step 8b, the gNB-DU$_{A/B}$ 602 then performs another gNB-CU selection until it finds the correct gNB-CU (e.g., the one that served the S-NSSAI(s) or slice(s) selected by the UE 600). In this example, the gNB-DU$_{A/B}$ 602 selects the gNB-CU$_B$ 606, which is the correct gNB-CU (i.e., the gNB-CU for the selected S-NSSAI(s) or slice(s) indicated in the RRC Setup Complete), and sends an F1 initial uplink RRC message to the selected gNB-CU$_B$ 606. The initial uplink RRC message includes an RRC container which, in this example, includes the RRC Setup Complete message.

Step 9b: At Step 9b, the gNB-CU$_A$ 604 confirms to the gNB-DU$_{A/B}$ 602 that the Context Release is complete.

Solution 2: RRC Reestablishment

Figure 7:
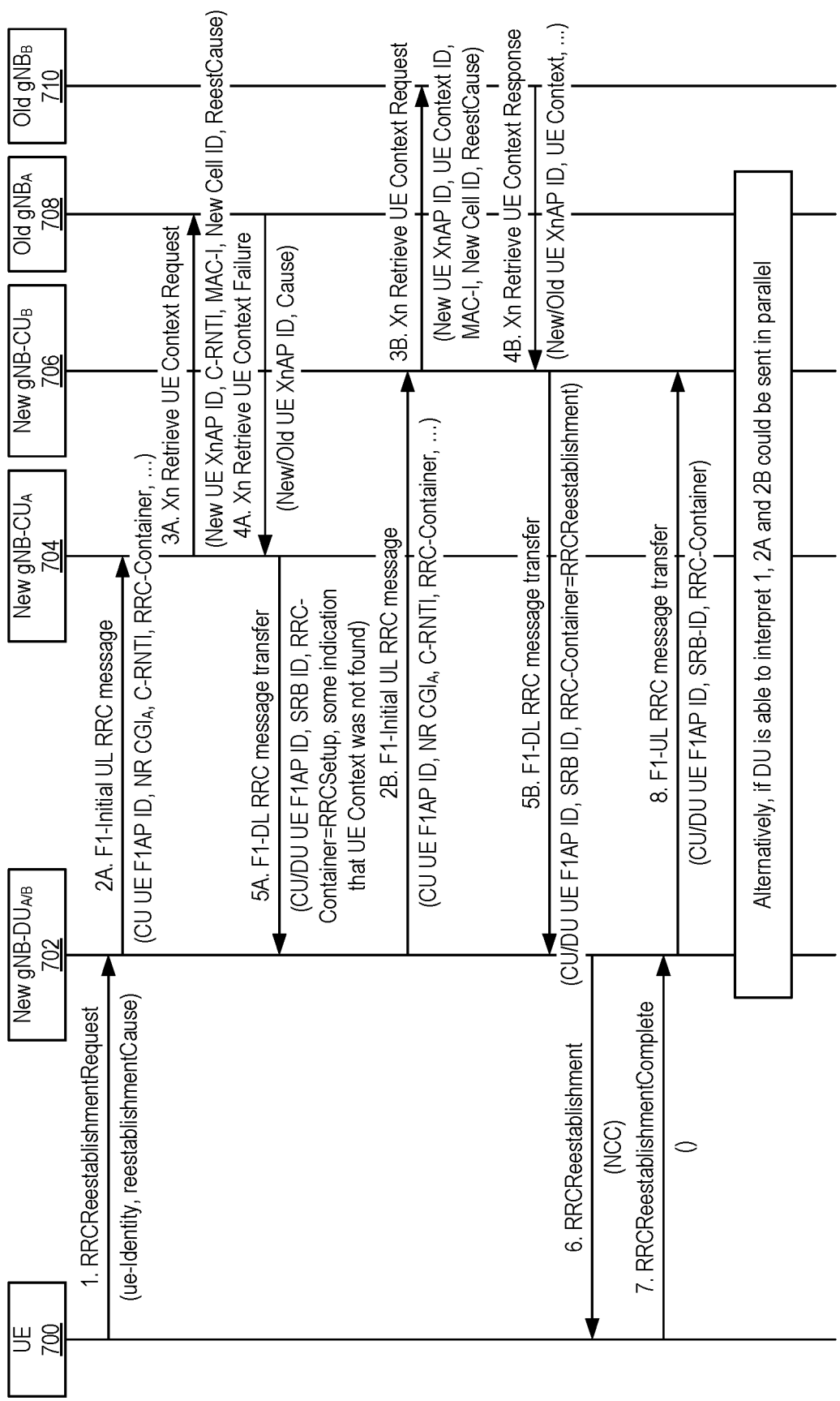
FIG. 7 shows a Radio Resource Control (RRC) Reestablishment procedure (including F1 messaging) in case of a CU-DU split with network sharing and/or network slicing, in accordance with some embodiments of the present disclosure.

FIG. 7 shows an RRC Reestablishment procedure (including F1 messaging) in case of a CU-DU split with network sharing and/or network slicing, in accordance with some embodiments of the present disclosure. Here, the RRC Reestablishment procedure is described with respect to a UE 700 and an implementation of at least two gNBs using either network sharing or network slicing, and CU/DU splitting, e.g., as described above with respect to FIGS. 3 and 4. In this example, the architecture includes two (logical) gNBs, denoted $gNB_A$ and $gNB_B$, including a shared gNB-DU (gNB implementation for both $gNB_A$ and $gNB_B$ using shared resources), which is denoted as $gNB\text{-}DU_{A/B}$ 702, and separate gNB-CUs, denoted as $gNB\text{-}CU_A$ 704 and $gNB\text{-}CU_B$ 706 for respective PLMNs (for network sharing) or network slices (for network slicing). The steps of the process of FIG. 7 are as follows:

- Step 1: The UE 700 sends an RRC Reestablishment Request to the (new) $gNB\text{-}DU_{A/B}$ 702.
- Step 2A: The $gNB\text{-}DU_{A/B}$ 702 sends an F1 uplink RRC message containing the RRC Reestablishment Request to the (new) $gNB\text{-}CU_A$ 704, in this example.
- Step 3A: The $gNB\text{-}CU_A$ 704 attempts to retrieve a UE context of the UE 700 from an (old) $gNB_A$ 708 by sending an $X_n$ Retrieve UE Context Request.
- Step 4A: In this example, the $gNB_A$ 708 does not have a UE context of the UE 700 because the $gNB\text{-}CU_A$ 704 is the wrong gNB-CU. As such, the $gNB_A$ 708 returns a Retrieve UE Context Failure message to the $gNB\text{-}CU_A$ 704.
- Step 5A: As illustrated in FIG. 7, after failing to retrieve the UE context at Step 4A, the wrong $gNB\text{-}CU_A$ 704 sends an RRC Setup message (e.g., in the RRC Message Transfer message) together with a special indication that informs the $gNB\text{-}DU_{A/B}$ 702 that the UE context retrieval failed (e.g., indication that the UE context has not been found).
- Step 2B: The $gNB\text{-}DU_{A/B}$ 702 can then try to contact a different gNB-CU until the UE context is successfully found. In other words, the $gNB\text{-}DU_{A/B}$ 702 sends an F1 initial uplink RRC message including the RRC Reestablishment Request to another gNB-CU, which in this example is the $gNB\text{-}CU_B$ 706.
- Step 3B: The $gNB\text{-}CU_B$ 706 attempts to retrieve a UE context of the UE 700 from an (old) $gNB_B$ 710 by sending an $X_n$ Retrieve UE Context Request.
- Step 4B: In this example, the $gNB_B$ 710 does have a UE context of the UE 700. As such, the $gNB_B$ 710 returns a Retrieve UE Context Response to the $gNB\text{-}CU_B$ 706.
- Step 5B: The $gNB\text{-}CU_B$ 706 sends an F1 downlink RRC message transfer including an RRC Reestablishment message to the $gNB\text{-}DU_{A/B}$ 702. Additionally, in Step 5B, a new indication that the UE context has been found can be added to inform the gNB-DU that a reestablishment procedure is being performed.
- Step 6: The $gNB\text{-}DU_{A/B}$ 702 sends the RRC Reestablishment message to the UE 700.
- Step 7: The UE 700 returns an RRC Reestablishment Complete to the $gNB\text{-}DU_{A/B}$ 702.
- Step 8: The $gNB\text{-}DU_{A/B}$ 702 sends an F1 uplink message transfer having an RRC container including the RRC Reestablishment Complete to the $gNB\text{-}CU_B$ 706.

Note that, in an alternative embodiment, Steps 2A and 2B may be performed in parallel.

Solution 3: RRC Resume Procedure

Figure 8:
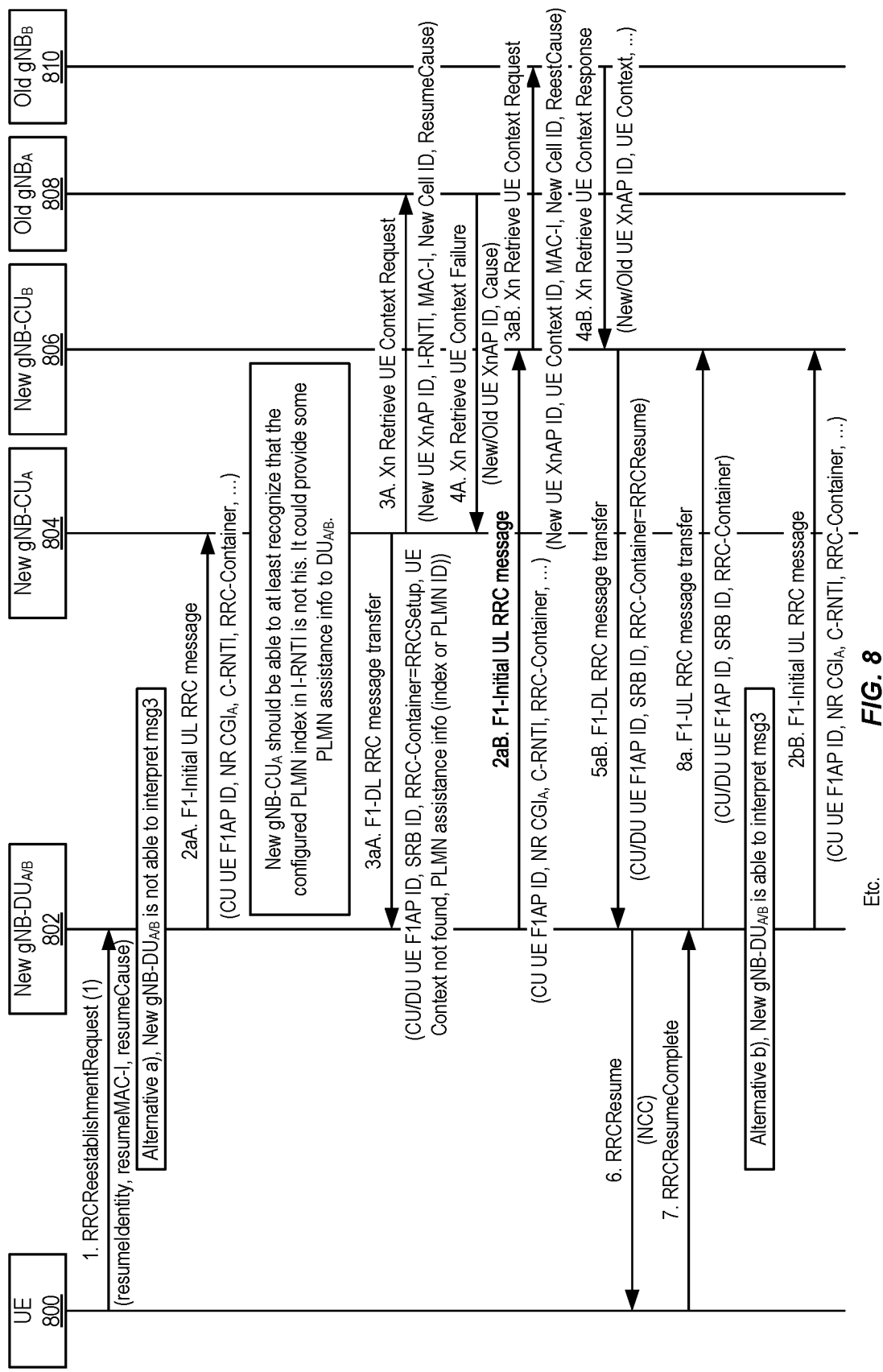
FIG. 8 shows the RRC Resume procedure for a CU-DU split with network sharing in accordance with some embodiments of the present disclosure.

FIG. 8 shows the RRC Resume procedure for a CU-DU split with network sharing in accordance with some embodiments of the present disclosure. Here, the RRC Resume procedure is described with respect to a UE 800 and an implementation of at least two gNBs using network sharing and CU/DU splitting, e.g., as described above with respect to FIG. 3. In this example, the architecture includes two (logical) gNBs, denoted $gNB_A$ and $gNB_B$, including a shared gNB-DU (gNB implementation for both $gNB_A$ and $gNB_B$ using shared resources), which is denoted as $gNB\text{-}DU_{A/B}$ 802, and separate gNB-CUs, denoted as $gNB\text{-}CU_A$ 804 and $gNB\text{-}CU_B$ 806. The steps of FIG. 8 are as follows:

- Step 1: The UE 800 sends an RRC Reestablishment Request to the (new) $gNB\text{-}DU_{A/B}$ 802. The RRC Reestablishment Request includes that the cause of the RRC Reestablishment Request is resume. Thus, the RRC Reestablishment Request is, in this context, also referred to herein as an RRC Resume Request.
- Alterative a: In Alternative (a), the $gNB\text{-}DU_{A/B}$ 802 is not able to interpret msg3.
  - Step 2aA: The $gNB\text{-}DU_{A/B}$ 802 sends an F1 initial uplink RRC message to one of the gNB-CUs, which in this example is the (new) $gNB\text{-}CU_A$ 804. As described in 3GPP TS 38.473 V15.6.0, the F1 initial uplink RRC message includes an F1AP ID, a New Radio (NR) Cell Group Identity (CGI) of the UE 800 for $gNB_A$ (denoted as $NR\ CGI_A$), a C-RNTI allocated for the UE 800 at the $gNB\text{-}DU_{A/B}$ 802, and an RRC container that, in this case, includes the RRC Reestablishment Request message from Step 1. As illustrated in FIG. 8, after the Initial uplink RRC message is sent from the $gNB\text{-}DU_{A/B}$ 802 to the $gNB\text{-}CU_A$ 804, the $gNB\text{-}CU_A$ 804 should be able to at least recognize that the configured PLMN index does not match.
  - Step 3aA: At Step 3aA the $gNB\text{-}CU_A$ 804 sends an RRC Message Transfer, with a PLMN ID and/or the RRC Resume message (as sent by the UE 800) to assist with gNB-CU selection. In Step 3aA, a new indication that the UE context has not been found can also be added to inform the $gNB\text{-}DU_{A/B}$ 802 that a reestablishment procedure is being performed.
  - Step 3A: The $gNB\text{-}CU_A$ 804 sends an $X_n$ Retrieve UE Context Request to an old $gNB_A$ 808.
  - Step 4A: In this example, the old $gNB_A$ 808 does not have the UE context of the UE 800 and, as such, returns an $X_n$ Retrieve UE Context Failure message to the $gNB\text{-}CU_A$ 804. The order of Step 3aA and Steps 3A-4A could also be the other way around (i.e., Steps 3A and 4A may precede Step 3aA).
  - Step 2aB: The $gNB\text{-}DU_{A/B}$ 802 performs another gNB-CU selection until it finds the correct gNB-CU (e.g., the one that served the PLMN selected by the UE). In other words, the $gNB\text{-}DU_{A/B}$ 802 performs a gNB-CU selection to select a different gNB-CU based on, e.g., the PLMN ID included in the RRC Container of the RRC message transfer of Step 3aA. In this example, the $gNB\text{-}DU_{A/B}$ 802 selects the $gNB\text{-}CU_B$ 806, which is the correct gNB-CU, and sends an F1 initial uplink RRC message to the selected $gNB\text{-}CU_B$ 806. The initial uplink RRC message includes an RRC container which, in this example, includes the RRC Resume message from the UE 800.

Step 3aB: The gNB-CU$_B$ 806 sends an X$_n$ Retrieve UE Context Request to an old gNB$_B$ 810.

Step 4aB: In this example, the old gNB$_A$ 810 does have the UE context of the UE 800 and, as such, returns an X$_n$ Retrieve UE Context Response message including the UE context of the UE 800 to the gNB-CU$_B$ 806.

Step 5aB: The gNB-CU$_B$ 806 sends an F1 downlink RRC message transfer to the gNB-DU$_{A/B}$ 802. This F1 downlink RRC message transfer includes an RRC container that includes an RRC Resume message.

Step 6: The gNB-DU$_{A/B}$ 802 sends the RRC Resume message to the UE 800.

Step 7: The UE 800 sends an RRC Resume Complete message to the gNB-DU$_{A/B}$ 802.

Step 8a: The gNB-DU$_{A/B}$ 802 sends an F1 uplink RRC message transfer to the gNB-CU$_B$ 806. This F1 uplink RRC message transfer includes an RRC container that includes the RRC Resume Complete message from the UE 800.

Alternative b: In Alternative (b), the gNB-DU$_{A/B}$ 802 is able to interpret msg3.

Step 2bB: The gNB-DU$_{A/B}$ 802 sends an F1 initial uplink RRC message to the gNB-CU$_B$ 806. This F1 initial uplink RRC message includes the RRC Resume Request from Step 1. The process then proceeds as described above with respect to Steps 3aB to Step 8a.

Figure 9:
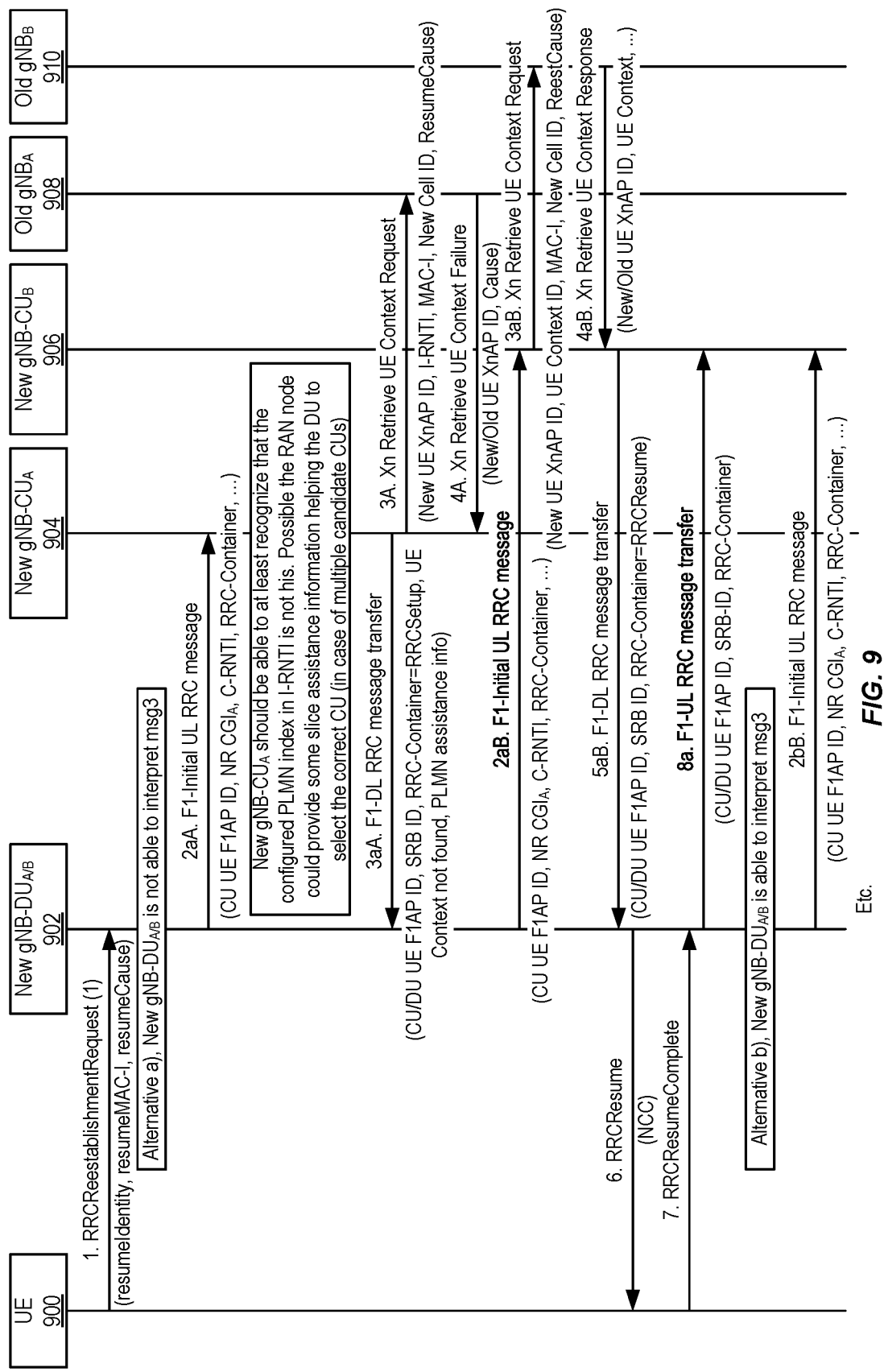
FIG. 9 the RRC Resume procedure for a CU-DU split with network slicing, in accordance with another embodiment of the present disclosure.

FIG. 9 illustrates the RRC Resume procedure for a CU-DU split with network slicing in accordance with another embodiment of the present disclosure. Here, the RRC Resume procedure is described with respect to a UE 900 and an implementation of at least two gNBs using network slicing and CU/DU splitting, e.g., as described above with respect to FIG. 4. In this example, the architecture includes two (logical) gNBs, denoted gNB$_A$ and gNB$_B$, including a shared gNB-DU (gNB implementation for both gNB$_A$ and gNB$_B$ using shared resources), which is denoted as gNB-DU$_{A/B}$ 902, and separate gNB-CUs, denoted as gNB-CU$_A$ 904 and gNB-CU$_B$ 906 for respective network slices. The steps of the process of FIG. 9 are as follows:

Step 1: The UE 900 sends an RRC Reestablishment Request to the (new) gNB-DU$_{A/B}$ 902. The RRC Reestablishment Request includes that the cause of the RRC Reestablishment Request is resume. Thus, the RRC Reestablishment Request is, in this context, also referred to herein as an RRC Resume Request.

Alternative a: In Alternative (a), the gNB-DU$_{A/B}$ 902 is not able to interpret msg3.

Step 2aA: The gNB-DU$_{A/B}$ 902 sends an F1 initial uplink RRC message to one of the gNB-CUs, which in this example is the (new) gNB-CU$_A$ 904. As described in 3GPP TS 38.473 V15.6.0, the F1 initial uplink RRC message includes an F1AP ID, a NR CGI of UE 800 for gNB$_A$ (denoted as NR CGI$_A$), a C-RNTI allocated for the UE 900 at the gNB-DU$_{A/B}$ 902, and an RRC container that, in this case, includes the RRC Reestablishment Request message (i.e., the RRC Resume Request) from Step 1. As illustrated in FIG. 9, after an Initial uplink RRC message is sent from the gNB-DU$_{A/B}$ 902 to the gNB-CU$_A$ 904, the gNB-CU$_A$ 904 should be able to at least recognize that the I-RNTI does not match. The RAN node could potentially provide some slice assistance information helping the gNB-DU$_{A/B}$ 902 to select the correct gNB-CU (in a case of multiple candidate gNB-CUs).

Step 3aA: At Step 3aA the gNB-CU$_A$ 904 sends an RRC Message Transfer with slice related information to assist with gNB-CU selection. In Step 3aA, a new indication that the UE context has not been found can also be added (e.g., to inform the gNB-DU$_{A/B}$ 902 that a reestablishment procedure is being performed).

Step 3A: The gNB-CU$_A$ 804 sends an X$_n$ Retrieve UE Context Request to an old gNB$_A$ 908.

Step 4A: In this example, the old gNB$_A$ 908 does not have the UE context of the UE 900 and, as such, returns an X$_n$ Retrieve UE Context Failure message to the gNB-CU$_A$ 904. The order of Step 3aA and Steps 3A-4A could also be the other way around (i.e., Steps 3A and 4A may precede Step 3aA).

Step 2aB: The gNB-DU$_{A/B}$ 902 performs another gNB-CU selection until it finds the correct gNB-CU (e.g., the one that served the slice selected by the UE 900). In other words, the gNB-DU$_{A/B}$ 902 performs a gNB-CU selection to select a different gNB-CU based on, e.g., the slice assistance information included in the RRC message transfer of Step 3aA. In this example, the gNB-DU$_{A/B}$ 902 selects the gNB-CU$_B$ 906, which is the correct gNB-CU, and sends an F1 initial uplink RRC message to the selected gNB-CU$_B$ 906. The initial uplink RRC message includes an RRC container which, in this example, includes the RRC Resume message from the UE 900.

Step 3aB: The gNB-CU$_B$ 906 sends an X$_n$ Retrieve UE Context Request to an old gNB$_B$ 910.

Step 4aB: In this example, the old gNB$_A$ 910 does have the UE context of the UE 900 and, as such, returns an X$_n$ Retrieve UE Context Response message including the UE context of the UE 900 to the gNB-CU$_B$ 906.

Step 5aB: The gNB-CU$_B$ 906 sends an F1 downlink RRC message transfer to the gNB-DU$_{A/B}$ 902. This F1 downlink RRC message transfer includes an RRC container that includes an RRC Resume message. In Step 5aB, a new indication that the UE context has been found can also be added (e.g., to inform the gNB-DU$_{A/B}$ 902 that a reestablishment procedure is being performed).

Step 6: The gNB-DU$_{A/B}$ 902 sends the RRC Resume message to the UE 900.

Step 7: The UE 900 sends an RRC Resume Complete message to the gNB-DU$_{A/B}$ 902.

Step 8a: The gNB-DU$_{A/B}$ 902 sends an F1 uplink RRC message transfer to the gNB-CU$_B$ 906. This F1 uplink RRC message transfer includes an RRC container that includes the RRC Resume Complete message from the UE 900.

Alternative b: In Alternative (b), the gNB-DU$_{A/B}$ 802 is able to interpret msg3.

Step 2bB: The gNB-DU$_{A/B}$ 902 sends an F1 initial uplink RRC message to the gNB-CU$_B$ 906. This F1 initial uplink RRC message includes the RRC Resume Request from Step 1. The process then proceeds as described above with respect to Steps 3aB to Step 8a.

Additional Embodiments

Apart from network sharing and network slicing, the proposed solution for re-direction in CU-DU split can be also applied to a scenario where the same operator decides to configure multiple gNB-CUs and/or multiple gNB-DUs that share the same physical resource for any other reason.

Additional Details

Figure 10:
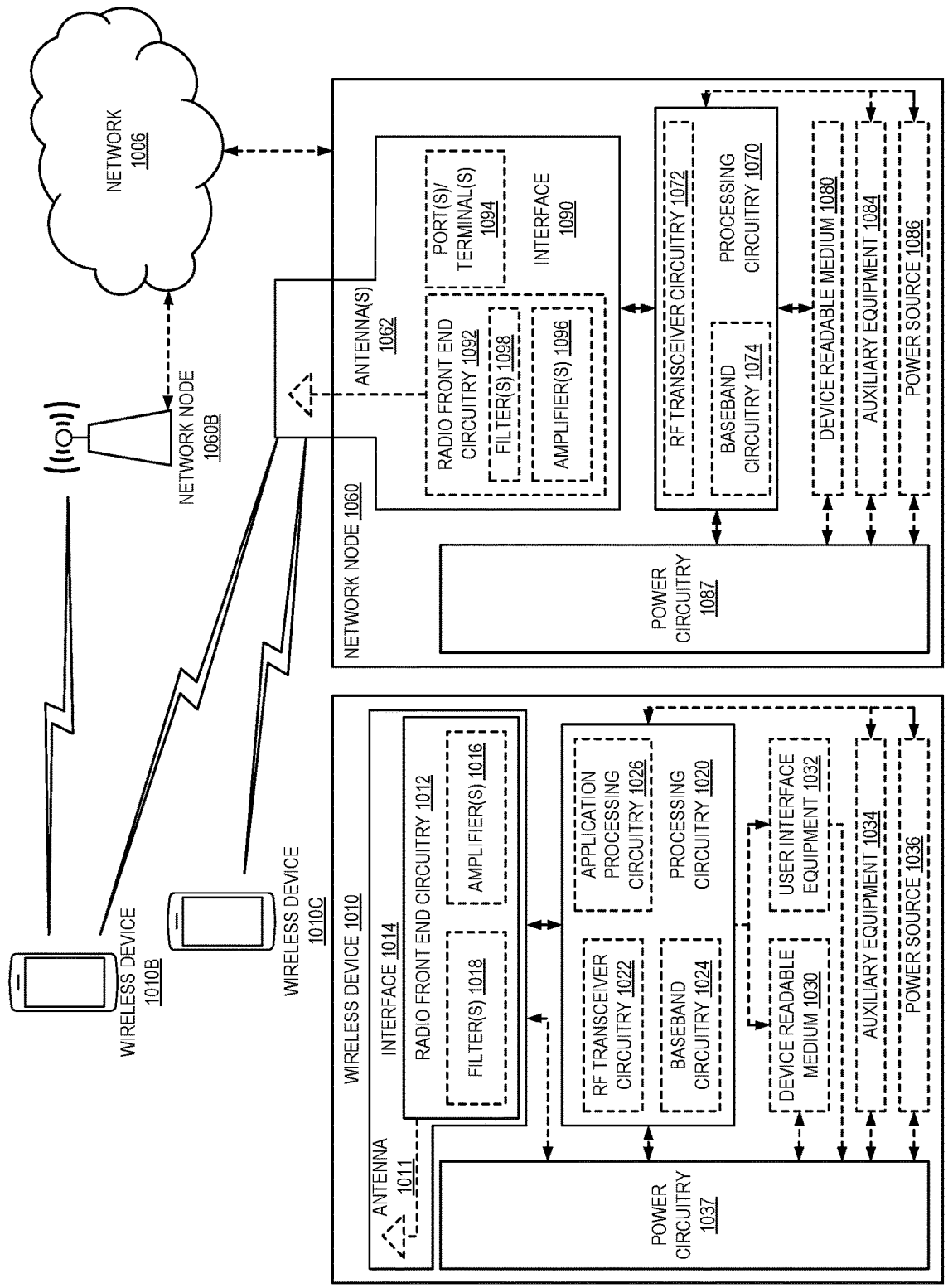
FIG. 10 illustrate an example of a wireless network in which embodiments of the present disclosure may be implemented.

Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts a network 1006, network nodes 1060 and 1060B, and Wireless Devices (WDs) 1010, 10106, and 1010C. In practice, a wireless network may further include any additional elements suitable to support communication between wireless devices or between a wireless device and another communication device, such as a landline telephone, a service provider, or any other network node or end device. Of the illustrated components, the network node 1060 and the WD 1010 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable Second, Third, Fourth, or Fifth Generation (2G, 3G, 4G, or 5G) standards (e.g., 3GPP NR standards).

The network 1006 may comprise one or more backhaul networks, core networks, Internet Protocol (IP) networks, Public Switched Telephone Networks (PSTNs), packet data networks, optical networks, Wide Area Networks (WANs), Local Area Networks (LANs), WLANs, wired networks, wireless networks, metropolitan area networks, and other networks to enable communication between devices.

The network node 1060 and the WD 1010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged, and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, Access Points (APs) (e.g., radio APs), Base Stations (BSs) (e.g., radio base stations, Node Bs, evolved Node Bs (eNBs), and gNBs), a gNB-DU, or a gNB-CU. Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or Remote Radio Units (RRUs), sometimes referred to as Remote Radio Heads (RRHs). Such RRUs may or may not be integrated with an antenna as an antenna integrated radio. Parts of a distributed radio base station may also be referred to as nodes in a Distributed Antenna System (DAS). Yet further examples of network nodes include Multi-Standard Radio (MSR) equipment such as MSR BSs, network controllers such as Radio Network Controllers (RNCs) or BS Controllers (BSCs), Base Transceiver Stations (BTSs), transmission points, transmission nodes, Multi-Cell/Multicast Coordination Entities (MCEs), core network nodes (e.g., Mobile Switching Centers (MSCs), Mobility Management Entities (MMEs)), Operation and Maintenance (O&M) nodes, Operations Support System (OSS) nodes, Self-Organizing Network (SON) nodes, positioning nodes (e.g., Evolved Serving Mobile Location Center (E-SMLCs)), and/or Minimization of Drive Tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, the network node 1060 includes processing circuitry 1070, a device readable medium 1080, an interface 1090, auxiliary equipment 1084, a power source 1086, power circuitry 1087, and an antenna 1062. Although the network node 1060 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions, and methods disclosed herein. Moreover, while the components of the network node 1060 are depicted as single boxes located within a larger box, or nested within multiple boxes, in practice, a network node may comprise multiple different physical components that make up a single illustrated component (e.g., the device readable medium 1080 may comprise multiple separate hard drives as well as multiple Random Access Memory (RAM) modules).

Similarly, the network node 1060 may be composed of multiple physically separate components (e.g., a Node B component and a RNC component, or a BTS component and a BSC component, a gNB with separate gNB-DU and gNB-CU components, etc.), which may each have their own respective components. In certain scenarios in which the network node 1060 comprises multiple separate components (e.g., BTS and BSC components), one or more of the separate components may be shared among several network nodes. For example, a single RNC may control multiple Node Bs. In such a scenario, each unique Node B and RNC pair may in some instances be considered a single separate network node. In some embodiments, the network node 1060 may be configured to support multiple Radio Access Technologies (RATs). In such embodiments, some components may be duplicated (e.g., a separate device readable medium 1080 for the different RATs) and some components may be reused (e.g., the same antenna 1062 may be shared by the RATs). The network node 1060 may also include multiple sets of the various illustrated components for different wireless technologies integrated into the network node 1060, such as, for example, GSM, Wideband Code Division Multiple Access (WCDMA), LTE, NR, WiFi, or Bluetooth wireless technologies. These wireless technologies may be integrated into the same or a different chip or set of chips and other components within the network node 1060.

The processing circuitry 1070 is configured to perform any determining, calculating, or similar operations (e.g., certain obtaining operations) described herein as being provided by a network node. These operations performed by the processing circuitry 1070 may include processing information obtained by the processing circuitry 1070 by, for example, converting the obtained information into other information, comparing the obtained information or converted information to information stored in the network node, and/or performing one or more operations based on the obtained information or converted information, and as a result of said processing making a determination.

The processing circuitry 1070 may comprise a combination of one or more of a microprocessor, a controller, a microcontroller, a Central Processing Unit (CPU), a Digital Signal Processor (DSP), an Application Specific Integrated Circuit (ASIC), a Field Programmable Gate Array (FPGA), or any other suitable computing device, resource, or combination of hardware, software, and/or encoded logic operable to provide, either alone or in conjunction with other network node 1060 components, such as the device readable medium 1080, network node 1060 functionality. For example, the processing circuitry 1070 may execute instructions stored in the device readable medium 1080 or in memory within the processing circuitry 1070. Such functionality may include providing any of the various wireless features, functions, or benefits discussed herein. In some embodiments, the processing circuitry 1070 may include a System on a Chip (SOC).

In some embodiments, the processing circuitry 1070 may include one or more of Radio Frequency (RF) transceiver circuitry 1072 and baseband processing circuitry 1074. In some embodiments, the RF transceiver circuitry 1072 and the baseband processing circuitry 1074 may be on separate chips (or sets of chips), boards, or units, such as radio units and digital units. In alternative embodiments, part or all of the RF transceiver circuitry 1072 and the baseband processing circuitry 1074 may be on the same chip or set of chips, boards, or units.

In certain embodiments, some or all of the functionality described herein as being provided by a network node, base station, eNB, or other such network device may be performed by the processing circuitry 1070 executing instructions stored on the device readable medium 1080 or memory within the processing circuitry 1070. In alternative embodiments, some or all of the functionality may be provided by the processing circuitry 1070 without executing instructions stored on a separate or discrete device readable medium, such as in a hard-wired manner. In any of those embodiments, whether executing instructions stored on a device readable storage medium or not, the processing circuitry 1070 can be configured to perform the described functionality. The benefits provided by such functionality are not limited to the processing circuitry 1070 alone or to other components of the network node 1060, but are enjoyed by the network node 1060 as a whole, and/or by end users and the wireless network generally.

The device readable medium 1080 may comprise any form of volatile or non-volatile computer readable memory including, without limitation, persistent storage, solid state memory, remotely mounted memory, magnetic media, optical media, RAM, Read Only Memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by the processing circuitry 1070. The device readable medium 1080 may store any suitable instructions; data or information, including a computer program; software; an application including one or more of logic, rules, code, tables, etc.; and/or other instructions capable of being executed by the processing circuitry 1070 and utilized by the network node 1060. The device readable medium 1080 may be used to store any calculations made by the processing circuitry 1070 and/or any data received via the interface 1090. In some embodiments, the processing circuitry 1070 and the device readable medium 1080 may be considered to be integrated.

The interface 1090 is used in the wired or wireless communication of signaling and/or data between the network node 1060, a network 1006, and/or WDs 1010. As illustrated, the interface 1090 comprises port(s)/terminal(s) 1094 to send and receive data, for example to and from the network 1006 over a wired connection. The interface 1090 also includes radio front end circuitry 1092 that may be coupled to, or in certain embodiments a part of, the antenna 1062. The radio front end circuitry 1092 comprises filters 1098 and amplifiers 1096. The radio front end circuitry 1092 may be connected to the antenna 1062 and the processing circuitry 1070. The radio front end circuitry 1092 may be configured to condition signals communicated between the antenna 1062 and the processing circuitry 1070. The radio front end circuitry 1092 may receive digital data that is to be sent out to other network nodes or WDs via a wireless connection. The radio front end circuitry 1092 may convert the digital data into a radio signal having the appropriate channel and bandwidth parameters using a combination of the filters 1098 and/or the amplifiers 1096. The radio signal may then be transmitted via the antenna 1062. Similarly, when receiving data, the antenna 1062 may collect radio signals which are then converted into digital data by the radio front end circuitry 1092. The digital data may be passed to the processing circuitry 1070. In other embodiments, the interface 1090 may comprise different components and/or different combinations of components.

In certain alternative embodiments, the network node 1060 may not include separate radio front end circuitry 1092; instead, the processing circuitry 1070 may comprise radio front end circuitry and may be connected to the antenna 1062 without separate radio front end circuitry 1092. Similarly, in some embodiments, all or some of the RF transceiver circuitry 1072 may be considered a part of the interface 1090. In still other embodiments, the interface 1090 may include the one or more ports or terminals 1094, the radio front end circuitry 1092, and the RF transceiver circuitry 1072 as part of a radio unit (not shown), and the interface 1090 may communicate with the baseband processing circuitry 1074, which is part of a digital unit (not shown).

The antenna 1062 may include one or more antennas, or antenna arrays, configured to send and/or receive wireless signals. The antenna 1062 may be coupled to the radio front end circuitry 1092 and may be any type of antenna capable of transmitting and receiving data and/or signals wirelessly. In some embodiments, the antenna 1062 may comprise one or more omni-directional, sector, or panel antennas operable to transmit/receive radio signals between, for example, 2 gigahertz (GHz) and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as Multiple Input Multiple Output (MIMO). In certain embodiments, the antenna 1062 may be separate from the network node 1060 and may be connectable to the network node 1060 through an interface or port.

The antenna 1062, the interface 1090, and/or the processing circuitry 1070 may be configured to perform any receiving operations and/or certain obtaining operations described herein as being performed by a network node. Any information, data, and/or signals may be received from a WD, another network node, and/or any other network equipment. Similarly, the antenna 1062, the interface 1090, and/or the processing circuitry 1070 may be configured to perform any transmitting operations described herein as being performed by a network node. Any information, data, and/or signals may be transmitted to a WD, another network node, and/or any other network equipment.

The power circuitry 1087 may comprise, or be coupled to, power management circuitry and is configured to supply the components of the network node 1060 with power for performing the functionality described herein. The power circuitry 1087 may receive power from the power source 1086. The power source 1086 and/or the power circuitry 1087 may be configured to provide power to the various components of the network node 1060 in a form suitable for the respective components (e.g., at a voltage and current level needed for each respective component). The power source 1086 may either be included in, or be external to, the power circuitry 1087 and/or the network node 1060. For example, the network node 1060 may be connectable to an external power source (e.g., an electricity outlet) via an input circuitry or interface such as an electrical cable, whereby the external power source supplies power to the power circuitry 1087. As a further example, the power source 1086 may comprise a source of power in the form of a battery or battery pack which is connected to, or integrated in, the power circuitry 1087. The battery may provide backup power should the external power source fail. Other types of power sources, such as photovoltaic devices, may also be used.

Alternative embodiments of the network node 1060 may include additional components beyond those shown in FIG. 10 that may be responsible for providing certain aspects of the network node's functionality, including any of the functionality described herein and/or any functionality necessary to support the subject matter described herein. For example, the network node 1060 may include user interface equipment to allow input of information into the network node 1060 and to allow output of information from the network node 1060. This may allow a user to perform diagnostic, maintenance, repair, and other administrative functions for the network node 1060.

As used herein, WD refers to a device capable, configured, arranged, and/or operable to communicate wirelessly with network nodes and/or other WDs. Unless otherwise noted, the term WD may be used interchangeably herein with UE. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a Voice over IP (VoIP) phone, a wireless local loop phone, a desktop computer, a Personal Digital Assistant (PDA), a wireless camera, a gaming console or device, a music storage device, a playback appliance, a wearable terminal device, a wireless endpoint, a mobile station, a tablet, a laptop, Laptop Embedded Equipment (LEE), Laptop Mounted Equipment (LME), a smart device, a wireless Customer Premise Equipment (CPE), a vehicle mounted wireless terminal device, etc. A WD may support Device-to-Device (D2D) communication, for example by implementing a 3GPP standard for sidelink communication, Vehicle-to-Vehicle (V2V), Vehicle-to-Infrastructure (V2I), Vehicle-to-Everything (V2X), and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a Machine-to-Machine (M2M) device, which may in a 3GPP context be referred to as a Machine-Type Communication (MTC) device. As one particular example, the WD may be a UE implementing the 3GPP Narrowband IoT (NB-IoT) standard. Particular examples of such machines or devices are sensors, metering devices such as power meters, industrial machinery, home or personal appliances (e.g., refrigerators, televisions, etc.), or personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated in FIG. 10, a WD 1010 includes an antenna 1011, an interface 1014, processing circuitry 1020, a device readable medium 1030, user interface equipment 1032, auxiliary equipment 1034, a power source 1036, and power circuitry 1037. The WD 1010 may include multiple sets of one or more of the illustrated components for different wireless technologies supported by the WD 1010, such as, for example, GSM, WCDMA, LTE, NR, WiFi, WiMAX, or Bluetooth wireless technologies, just to mention a few. These wireless technologies may be integrated into the same or different chips or set of chips as other components within the WD 1010.

The antenna 1011 may include one or more antennas or antenna arrays configured to send and/or receive wireless signals and is connected to the interface 1014. In certain alternative embodiments, the antenna 1011 may be separate from the WD 1010 and be connectable to the WD 1010 through an interface or port. The antenna 1011, the interface 1014, and/or the processing circuitry 1020 may be configured to perform any receiving or transmitting operations described herein as being performed by a WD. Any information, data, and/or signals may be received from a network node and/or another WD. In some embodiments, radio front end circuitry and/or the antenna 1011 may be considered an interface.

As illustrated, the interface 1014 comprises radio front end circuitry 1012 and the antenna 1011. The radio front end circuitry 1012 comprises one or more filters 1018 and amplifiers 1016. The radio front end circuitry 1012 is connected to the antenna 1011 and the processing circuitry 1020 and is configured to condition signals communicated between the antenna 1011 and the processing circuitry 1020. The radio front end circuitry 1012 may be coupled to or be a part of the antenna 1011. In some embodiments, the WD 1010 may not include separate radio front end circuitry 1012; rather, the processing circuitry 1020 may comprise radio front end circuitry and may be connected to the antenna 1011. Similarly, in some embodiments, some or all of RF transceiver circuitry 1022 may be considered a part of the interface 1014. The radio front end circuitry 1012 may receive digital data that is to be sent out to other network nodes or WDs via a wireless connection. The radio front end circuitry 1012 may convert the digital data into a radio signal having the appropriate channel and bandwidth parameters using a combination of the filters 1018 and/or the amplifiers 1016. The radio signal may then be transmitted via the antenna 1011. Similarly, when receiving data, the antenna 1011 may collect radio signals which are then converted into digital data by the radio front end circuitry 1012. The digital data may be passed to the processing circuitry 1020. In other embodiments, the interface 1014 may comprise different components and/or different combinations of components.

The processing circuitry 1020 may comprise a combination of one or more of a microprocessor, a controller, a microcontroller, a CPU, a DSP, an ASIC, a FPGA, or any other suitable computing device, resource, or combination of hardware, software, and/or encoded logic operable to provide, either alone or in conjunction with other WD 1010 components, such as the device readable medium 1030, WD 1010 functionality. Such functionality may include providing any of the various wireless features or benefits discussed herein. For example, the processing circuitry 1020 may execute instructions stored in the device readable medium 1030 or in memory within the processing circuitry 1020 to provide the functionality disclosed herein.

As illustrated, the processing circuitry 1020 includes one or more of the RF transceiver circuitry 1022, baseband processing circuitry 1024, and application processing circuitry 1026. In other embodiments, the processing circuitry 1020 may comprise different components and/or different combinations of components. In certain embodiments, the processing circuitry 1020 of the WD 1010 may comprise a SOC. In some embodiments, the RF transceiver circuitry 1022, the baseband processing circuitry 1024, and the application processing circuitry 1026 may be on separate chips or sets of chips. In alternative embodiments, part or all of the baseband processing circuitry 1024 and the application processing circuitry 1026 may be combined into one chip or set of chips, and the RF transceiver circuitry 1022 may be on a separate chip or set of chips. In still alternative embodiments, part or all of the RF transceiver circuitry 1022 and the baseband processing circuitry 1024 may be on the same chip or set of chips, and the application processing circuitry 1026 may be on a separate chip or set of chips. In yet other alternative embodiments, part or all of the RF transceiver circuitry 1022, the baseband processing circuitry 1024, and the application processing circuitry 1026 may be combined in the same chip or set of chips. In some embodiments, the RF transceiver circuitry 1022 may be a part of the interface 1014. The RF transceiver circuitry 1022 may condition RF signals for the processing circuitry 1020.

In certain embodiments, some or all of the functionality described herein as being performed by a WD may be provided by the processing circuitry 1020 executing instructions stored on the device readable medium 1030, which in certain embodiments may be a computer-readable storage medium. In alternative embodiments, some or all of the functionality may be provided by the processing circuitry 1020 without executing instructions stored on a separate or discrete device readable storage medium, such as in a hard-wired manner. In any of those particular embodiments, whether executing instructions stored on a device readable storage medium or not, the processing circuitry 1020 can be configured to perform the described functionality. The benefits provided by such functionality are not limited to the processing circuitry 1020 alone or to other components of the WD 1010, but are enjoyed by the WD 1010 as a whole, and/or by end users and the wireless network generally.

The processing circuitry 1020 may be configured to perform any determining, calculating, or similar operations (e.g., certain obtaining operations) described herein as being performed by a WD. These operations, as performed by the processing circuitry 1020, may include processing information obtained by the processing circuitry 1020 by, for example, converting the obtained information into other information, comparing the obtained information or converted information to information stored by the WD 1010, and/or performing one or more operations based on the obtained information or converted information, and as a result of said processing making a determination.

The device readable medium 1030 may be operable to store a computer program; software; an application including one or more of logic, rules, code, tables, etc.; and/or other instructions capable of being executed by the processing circuitry 1020. The device readable medium 1030 may include computer memory (e.g., RAM or ROM), mass storage media (e.g., a hard disk), removable storage media (e.g., a CD or a DVD), and/or any other volatile or non-volatile, non-transitory device readable and/or computer executable memory devices that store information, data, and/or instructions that may be used by the processing circuitry 1020. In some embodiments, the processing circuitry 1020 and the device readable medium 1030 may be considered to be integrated.

The user interface equipment 1032 may provide components that allow for a human user to interact with the WD 1010. Such interaction may be of many forms, such as visual, audial, tactile, etc. The user interface equipment 1032 may be operable to produce output to the user and to allow the user to provide input to the WD 1010. The type of interaction may vary depending on the type of user interface equipment 1032 installed in the WD 1010. For example, if the WD 1010 is a smart phone, the interaction may be via a touch screen; if the WD 1010 is a smart meter, the interaction may be through a screen that provides usage (e.g., the number of gallons used) or a speaker that provides an audible alert (e.g., if smoke is detected). The user interface equipment 1032 may include input interfaces, devices and circuits, and output interfaces, devices and circuits. The user interface equipment 1032 is configured to allow input of information into the WD 1010, and is connected to the processing circuitry 1020 to allow the processing circuitry 1020 to process the input information. The user interface equipment 1032 may include, for example, a microphone, a proximity or other sensor, keys/buttons, a touch display, one or more cameras, a Universal Serial Bus (USB) port, or other input circuitry. The user interface equipment 1032 is also configured to allow output of information from the WD 1010 and to allow the processing circuitry 1020 to output information from the WD 1010. The user interface equipment 1032 may include, for example, a speaker, a display, vibrating circuitry, a USB port, a headphone interface, or other output circuitry. Using one or more input and output interfaces, devices, and circuits of the user interface equipment 1032, the WD 1010 may communicate with end users and/or the wireless network, and allow them to benefit from the functionality described herein.

The auxiliary equipment 1034 is operable to provide more specific functionality which may not be generally performed by WDs. This may comprise specialized sensors for doing measurements for various purposes, interfaces for additional types of communication such as wired communications, etc. The inclusion and type of components of the auxiliary equipment 1034 may vary depending on the embodiment and/or scenario.

The power source 1036 may, in some embodiments, be in the form of a battery or battery pack. Other types of power sources, such as an external power source (e.g., an electricity outlet), photovoltaic devices, or power cells may also be used. The WD 1010 may further comprise the power circuitry 1037 for delivering power from the power source 1036 to the various parts of the WD 1010 which need power from the power source 1036 to carry out any functionality described or indicated herein. The power circuitry 1037 may in certain embodiments comprise power management circuitry. The power circuitry 1037 may additionally or alternatively be operable to receive power from an external power source, in which case the WD 1010 may be connectable to the external power source (such as an electricity outlet) via input circuitry or an interface such as an electrical power cable. The power circuitry 1037 may also in certain embodiments be operable to deliver power from an external power source to the power source 1036. This may be, for example, for the charging of the power source 1036. The power circuitry 1037 may perform any formatting, converting, or other modification to the power from the power source 1036 to make the power suitable for the respective components of the WD 1010 to which power is supplied.

Figure 11:
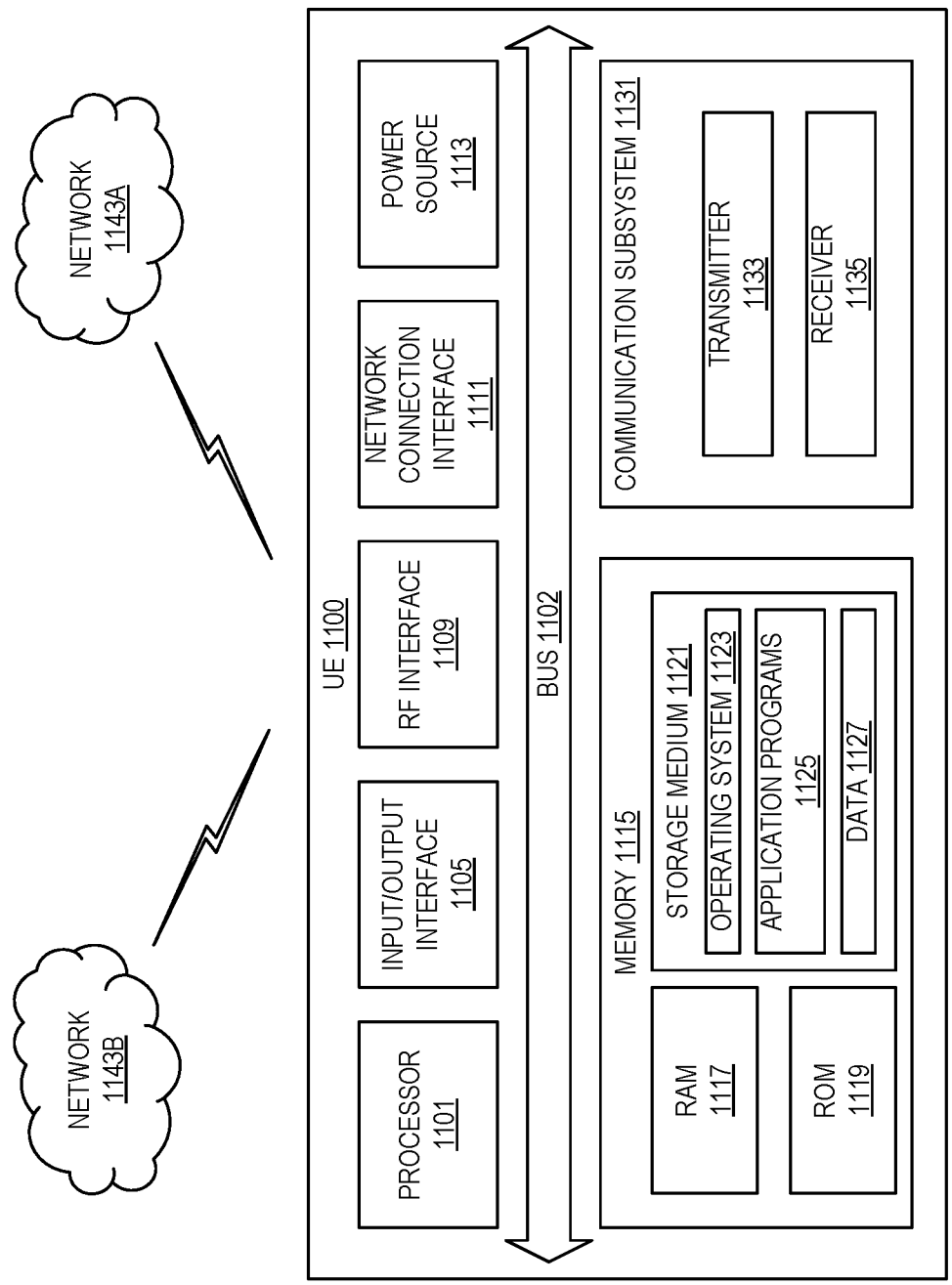
FIG. 11 illustrates one embodiment of a User Equipment (UE) in accordance with various aspects described herein.

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). A UE 1100 may be any UE identified by 3GPP, including a NB-IoT UE, a MTC UE, and/or an enhanced MTC (eMTC) UE. The UE 1100, as illustrated in FIG. 11, is one example of a WD configured for communication in accordance with one or more communication standards promulgated by 3GPP, such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, the UE 1100 includes processing circuitry 1101 that is operatively coupled to an input/output interface 1105, an RF interface 1109, a network connection interface 1111, memory 1115 including RAM 1117, ROM 1119, and a storage medium 1121 or the like, a communication subsystem 1131, a power source 1113, and/or any other component, or any combination thereof. The storage medium 1121 includes an operating system 1123, an application program 1125, and data 1127. In other embodiments, the storage medium 1121 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, the processing circuitry 1101 may be configured to process computer instructions and data. The processing circuitry 1101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored programs, general purpose processors, such as a microprocessor or DSP, together with appropriate software; or any combination of the above. For example, the processing circuitry 1101 may include two CPUs. Data may be information in a form suitable for use by a computer.

In the depicted embodiment, the input/output interface 1105 may be configured to provide a communication interface to an input device, output device, or input and output device. The UE 1100 may be configured to use an output device via the input/output interface 1105. An output device may use the same type of interface port as an input device. For example, a USB port may be used to provide input to and output from the UE 1100. The output device may be a speaker, a sound card, a video card, a display, a monitor, a printer, an actuator, an emitter, a smartcard, another output device, or any combination thereof. The UE 1100 may be configured to use an input device via the input/output interface 1105 to allow a user to capture information into the UE 1100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, the RF interface 1109 may be configured to provide a communication interface to RF components such as a transmitter, a receiver, and an antenna. The network connection interface 1111 may be configured to provide a communication interface to a network 1143A. The network 1143A may encompass wired and/or wireless networks such as a LAN, a WAN, a computer network, a wireless network, a telecommunications network, another like network or any combination thereof. For example, the network 1143A may comprise a WiFi network. The network connection interface 1111 may be configured to include a receiver and a transmitter interface used to communicate with one or more other devices over a communication network according to one or more communication protocols, such as Ethernet, Transmission Control Protocol (TCP)/IP, Synchronous Optical Networking (SONET), Asynchronous Transfer Mode (ATM), or the like. The network connection interface 1111 may implement receiver and transmitter functionality appropriate to the communication network links (e.g., optical, electrical, and the like). The transmitter and receiver functions may share circuit components, software, or firmware, or alternatively may be implemented separately.

The RAM 1117 may be configured to interface via a bus 1102 to the processing circuitry 1101 to provide storage or caching of data or computer instructions during the execution of software programs such as the operating system, application programs, and device drivers. The ROM 1119 may be configured to provide computer instructions or data to the processing circuitry 1101. For example, the ROM 1119 may be configured to store invariant low-level system code or data for basic system functions such as basic Input and Output (I/O), startup, or reception of keystrokes from a keyboard that are stored in a non-volatile memory. The storage medium 1121 may be configured to include memory such as RAM, ROM, Programmable ROM (PROM), Erasable PROM (EPROM), Electrically EPROM (EEPROM), magnetic disks, optical disks, floppy disks, hard disks, removable cartridges, or flash drives. In one example, the storage medium 1121 may be configured to include the operating system 1123, the application program 1125 such as a web browser application, a widget or gadget engine, or another application, and the data file 1127. The storage medium 1121 may store, for use by the UE 1100, any of a variety of various operating systems or combinations of operating systems.

The storage medium 1121 may be configured to include a number of physical drive units, such as a Redundant Array of Independent Disks (RAID), a floppy disk drive, flash memory, a USB flash drive, an external hard disk drive, a thumb drive, a pen drive, a key drive, a High-Density Digital Versatile Disc (HD-DVD) optical disc drive, an internal hard disk drive, a Blu-Ray optical disc drive, a Holographic Digital Data Storage (HDDS) optical disc drive, an external mini-Dual In-Line Memory Module (DIMM), Synchronous Dynamic RAM (SDRAM), external micro-DIMM SDRAM, smartcard memory such as a Subscriber Identity Module (SIM) or a Removable User Identity (RUIM) module, other memory, or any combination thereof. The storage medium 1121 may allow the UE 1100 to access computer-executable instructions, application programs, or the like, stored on transitory or non-transitory memory media, to off-load data or to upload data. An article of manufacture, such as one utilizing a communication system, may be tangibly embodied in the storage medium 1121, which may comprise a device readable medium.

In FIG. 11, the processing circuitry 1101 may be configured to communicate with a network 1143B using the communication subsystem 1131. The network 1143A and the network 1143B may be the same network or networks or different network or networks. The communication subsystem 1131 may be configured to include one or more transceivers used to communicate with the network 1143B. For example, the communication subsystem 1131 may be configured to include one or more transceivers used to communicate with one or more remote transceivers of another device capable of wireless communication such as another WD, UE, or base station of a RAN according to one or more communication protocols, such as IEEE 802.11, Code Division Multiple Access (CDMA), WCDMA, GSM, LTE, Universal Terrestrial RAN (UTRAN), WiMax, or the like. Each transceiver may include a transmitter 1133 and/or a receiver 1135 to implement transmitter or receiver functionality, respectively, appropriate to the RAN links (e.g., frequency allocations and the like). Further, the transmitter 1133 and the receiver 1135 of each transceiver may share circuit components, software, or firmware, or alternatively may be implemented separately.

In the illustrated embodiment, the communication functions of the communication subsystem 1131 may include data communication, voice communication, multimedia communication, short-range communications such as Bluetooth, near-field communication, location-based communication such as the use of the Global Positioning System (GPS) to determine a location, another like communication function, or any combination thereof. For example, the communication subsystem 1131 may include cellular communication, WiFi communication, Bluetooth communication, and GPS communication. The network 1143B may encompass wired and/or wireless networks such as a LAN, a WAN, a computer network, a wireless network, a telecommunications network, another like network, or any combination thereof. For example, the network 1143B may be a cellular network, a WiFi network, and/or a near-field network. A power source 1113 may be configured to provide Alternating Current (AC) or Direct Current (DC) power to components of the UE 1100.

The features, benefits, and/or functions described herein may be implemented in one of the components of the UE 1100 or partitioned across multiple components of the UE 1100. Further, the features, benefits, and/or functions described herein may be implemented in any combination of hardware, software, or firmware. In one example, the communication subsystem 1131 may be configured to include any of the components described herein. Further, the processing circuitry 1101 may be configured to communicate with any of such components over the bus 1102. In another example, any of such components may be represented by program instructions stored in memory that, when executed by the processing circuitry 1101, perform the corresponding functions described herein. In another example, the functionality of any of such components may be partitioned between the processing circuitry 1101 and the communication subsystem 1131. In another example, the non-computationally intensive functions of any of such components may be implemented in software or firmware and the computationally intensive functions may be implemented in hardware.

Figure 12:
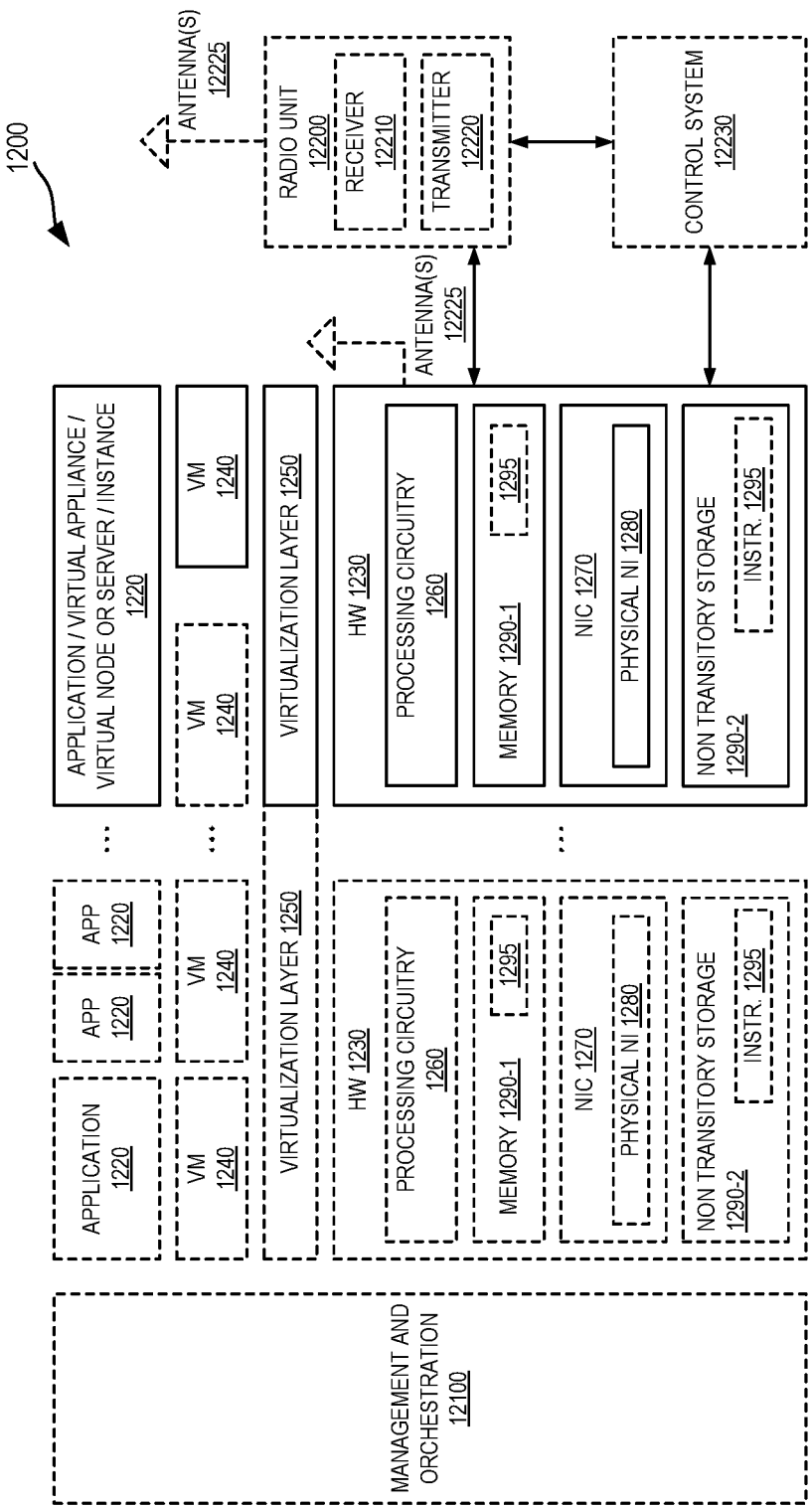
FIG. 12 is a schematic block diagram illustrating a virtualization environment in which functions implemented by some embodiments may be virtualized.

FIG. 12 is a schematic block diagram illustrating a virtualization environment 1200 in which functions implemented by some embodiments may be virtualized. In the present context, virtualizing means creating virtual versions of apparatuses or devices which may include virtualizing hardware platforms, storage devices, and networking resources. As used herein, virtualization can be applied to a node (e.g., a virtualized base station or a virtualized radio access node) or to a device (e.g., a UE, a WD, or any other type of communication device) or components thereof and relates to an implementation in which at least a portion of the functionality is implemented as one or more virtual components (e.g., via one or more applications, components, functions, virtual machines, or containers executing on one or more physical processing nodes in one or more networks).

In some embodiments, some or all of the functions described herein may be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node may be entirely virtualized.

The functions may be implemented by one or more applications 1220 (which may alternatively be called software instances, virtual appliances, network functions, virtual nodes, virtual network functions, etc.) operative to implement some of the features, functions, and/or benefits of some of the embodiments disclosed herein. The applications 1220 are run in the virtualization environment 1200 which provides hardware 1230 comprising processing circuitry 1260 and memory 1290. The memory 1290 contains instructions 1295 executable by the processing circuitry 1260 whereby the application 1220 is operative to provide one or more of the features, benefits, and/or functions disclosed herein.

The virtualization environment 1200 comprises general-purpose or special-purpose network hardware devices 1230 comprising a set of one or more processors or processing circuitry 1260, which may be Commercial Off-the-Shelf (COTS) processors, dedicated ASICs, or any other type of processing circuitry including digital or analog hardware components or special purpose processors. Each hardware device 1230 may comprise memory 1290-1 which may be non-persistent memory for temporarily storing instructions 1295 or software executed by the processing circuitry 1260. Each hardware device 1230 may comprise one or more Network Interface Controllers (NICs) 1270, also known as network interface cards, which include a physical network interface 1280. Each hardware device 1230 may also include non-transitory, persistent, machine-readable storage media 1290-2 having stored therein software 1295 and/or instructions executable by the processing circuitry 1260. The software 1295 may include any type of software including software for instantiating one or more virtualization layers 1250 (also referred to as hypervisors), software to execute virtual machines 1240, as well as software allowing it to execute functions, features, and/or benefits described in relation with some embodiments described herein.

The virtual machines 1240, comprise virtual processing, virtual memory, virtual networking or interface, and virtual storage, and may be run by a corresponding virtualization layer 1250 or hypervisor. Different embodiments of the instance of virtual appliance 1220 may be implemented on one or more of the virtual machines 1240, and the implementations may be made in different ways.

During operation, the processing circuitry 1260 executes the software 1295 to instantiate the hypervisor or virtualization layer 1250, which may sometimes be referred to as a Virtual Machine Monitor (VMM). The virtualization layer 1250 may present a virtual operating platform that appears like networking hardware to the virtual machine 1240.

As shown in FIG. 12, the hardware 1230 may be a standalone network node with generic or specific components. The hardware 1230 may comprise an antenna 12225 and may implement some functions via virtualization. Alternatively, the hardware 1230 may be part of a larger cluster of hardware (e.g., such as in a data center or CPE) where many hardware nodes work together and are managed via a Management and Orchestration (MANO) 12100, which, among others, oversees lifecycle management of the applications 1220.

Virtualization of the hardware is in some contexts referred to as Network Function Virtualization (NFV). NFV may be used to consolidate many network equipment types onto industry standard high volume server hardware, physical switches, and physical storage, which can be located in data centers and CPE.

In the context of NFV, the virtual machine 1240 may be a software implementation of a physical machine that runs programs as if they were executing on a physical, non-virtualized machine. Each of the virtual machines 1240, and that part of the hardware 1230 that executes that virtual machine 1240, be it hardware dedicated to that virtual machine 1240 and/or hardware shared by that virtual machine 1240 with others of the virtual machines 1240, forms a separate Virtual Network Element (VNE).

Still in the context of NFV, Virtual Network Function (VNF) is responsible for handling specific network functions that run in one or more virtual machines 1240 on top of the hardware networking infrastructure 1230 and corresponds to the application 1220 in FIG. 12.

In some embodiments, one or more radio units 12200 that each include one or more transmitters 12220 and one or more receivers 12210 may be coupled to the one or more antennas 12225. The radio units 12200 may communicate directly with the hardware nodes 1230 via one or more appropriate network interfaces and may be used in combination with the virtual components to provide a virtual node with radio capabilities, such as a radio access node or a base station.

In some embodiments, some signaling can be effected with the use of a control system 12230, which may alternatively be used for communication between the hardware nodes 1230 and the radio unit 12200.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, RAM, cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices, and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some example embodiments of the present disclosure are as follows:

Embodiment 1

A method for supporting network sharing and/or network slicing in a radio access network, the method comprising: determining an error in connecting a wireless device with a central unit of a first base station; signaling the error between the central unit of the first base station and a distributed unit of the first base station; facilitating an attempt to connect the wireless device to a central unit of a second base station.

Embodiment 2

The method of embodiment 1 wherein the first base station and the second base station share common cell resources.

Embodiment 3

The method of embodiment 1 wherein the distributed unit of the first base station and a distributed unit of the second base station share common resources.

Embodiment 4

The method of any one of embodiments 1 to 3 wherein the error is an error in selection of the central unit of the first base station for initial attachment of the wireless device, reestablishment of a connection of the wireless device, or resuming of a connection of the wireless device.

Embodiment 5

The method of any one of embodiments 1 to 3, wherein the error is an error in selection of the central unit of the first base station during an initial attachment procedure for the wireless device.

Embodiment 6

The method of embodiment 5, wherein: the central unit of the first base station recognizes the error; and signaling the error comprises signaling, by the central unit of the first base station, the error and sending to the distributed unit of the first base station assistance information for supporting the attempt to connect the wireless device to the central unit of the second base station.

Embodiment 7

The method of embodiment 5, wherein: the distributed unit of the first base station recognizes the error; signaling the error comprises signaling, by the distributed unit of the first base station, the error; and facilitating the attempt to connect the wireless device to the central unit of the second base station comprises attempting, by the distributed unit of the first base station, to connect the wireless device to the central unit of the second base station.

Embodiment 8

The method of any one of embodiments 1 to 3, wherein the error is an error in selection of the central unit of the first base station during a radio resource control (RRC) reestablishment procedure for the wireless device.

Embodiment 9

The method of embodiment 8, wherein signaling the error comprises sending an indication of the error from the central unit of the first base station to the distributed unit of the first base station.

Embodiment 10

The method of any one of embodiments 1 to 3, wherein the error is an error in selection of the central unit of the first base station during a radio resource control (RRC) resume procedure for the wireless device.

Embodiment 11

The method of embodiment 10, wherein signaling the error comprises sending an indication of the error from the central unit of the first base station to the distributed unit of the first base station along with assistance information for supporting the attempt to connect the wireless device to the central unit of the second base station.

Embodiment 12

A base station for supporting network sharing and/or network slicing, the base station comprising: processing circuitry configured to perform any of the steps of any of embodiments 1 to 11; and power supply circuitry configured to supply power to the base station.

At least some of the following abbreviations may be used in this disclosure. If there is an inconsistency between abbreviations, preference should be given to how it is used above. If listed multiple times below, the first listing should be preferred over any subsequent listing(s).

2G Second Generation
3G Third Generation
3GPP Third Generation Partnership Project
4G Fourth Generation
5G Fifth Generation
5GC Fifth Generation Core Network
5GS Fifth Generation System
AC Alternating Current
AMF Access and Mobility Management Function
AP Access Point
ASIC Application Specific Integrated Circuit
ATM Asynchronous Transfer Mode
BS Base Station
BSC Base Station Controller
BTS Base Transceiver Station
CD Compact Disk
CDMA Code Division Multiple Access
CGI Cell Global Identity
COTS Commercial Off-the-Shelf
CP Control Plane
CPE Customer Premise Equipment
CPU Central Processing Unit
C-RNTI Cell Radio Network Temporary Identifier
CU Central Unit
D2D Device-to-Device
DAS Distributed Antenna System
DC Direct Current
DIMM Dual In-Line Memory Module
DSP Digital Signal Processor
DU Distributed Unit
DVD Digital Video Disk
EEPROM Electrically Erasable Programmable Read Only Memory
eMTC Enhanced Machine Type Communication
eNB Evolved Node B
EN-DC Evolved Universal Terrestrial Radio Access Network New Radio—Dual Connectivity
EPROM Erasable Programmable Read Only Memory
E-SMLC Evolved Serving Mobile Location Center
E-UTRAN Evolved Universal Terrestrial Radio Access Network
F1AP F1 Application Protocol
FDD Frequency Division Duplexing
FPGA Field Programmable Gate Array
GHz Gigahertz
gNB Next Generation Node B gNB-CU Next Generation Node B Central Unit
gNB-DU Next Generation Node B Distributed Unit
GPS Global Positioning System
GSM Global System for Mobile Communications
HDDS Holographic Digital Data Storage
HD-DVD High-Density Digital Versatile Disc
ID Identity
I/O Input and Output
IoT Internet of Things
IP Internet Protocol
I-RNTI Inactive Radio Network Temporary Identifier
LAN Local Area Network
LEE Laptop Embedded Equipment
LME Laptop Mounted Equipment
LTE Long Term Evolution
M2M Machine-to-Machine
MAC Medium Access Control
MANO Management and Orchestration
MCE Multi-Cell/Multicast Coordination Entity
MDT Minimization of Drive Tests
MIMO Multiple Input Multiple Output
MME Mobility Management Entity
MOCN Multi Operator Core Network
MSC Mobile Switching Center
MSR Multi-Standard Radio
MTC Machine Type Communication
NB-IoT Narrowband Internet of Things
NFV Network Function Virtualization
NG Next Generation
NGMN Next Generation Mobile Network
NIC Network Interface Controller
NR New Radio
NR CGI Next Generation Radio Access Network Cell Global Identifier
O&M Operation and Maintenance
OSS Operations Support System
PDA Personal Digital Assistant
PHY Physical
PLMN Public Land Mobile Network
PROM Programmable Read Only Memory
PSTN Public Switched Telephone Network
RAID Redundant Array of Independent Disks
RAM Random Access Memory
RAN Radio Access Network
RAT Radio Access Technology
RF Radio Frequency
RNC Radio Network Controller
RNL Radio Network Layer
ROM Read Only Memory
RRC Radio Resource Control
RUIM Removable User Identity
RRH Remote Radio Head
RRU Remote Radio Unit
SDRAM Synchronous Dynamic Random Access Memory
SIM Subscriber Identity Module
S-NSSAI Single Network Slice Selection Assistance Information
SOC System on a Chip
SON Self-Organizing Network
SONET Synchronous Optical Networking
SRB Signaling Radio Bearer
TA Tracking Area
TAC Tracking Area Code
TAI Tracking Area Identity
TCP Transmission Control Protocol
TDD Time Division Duplexing
TNL Transport Network Layer
TS Technical Specification
UE User Equipment
UMTS Universal Mobile Telecommunications System
UP User Plane
USB Universal Serial Bus
UTRAN Universal Terrestrial Radio Access Network
V2I Vehicle-to-Infrastructure
V2V Vehicle-to-Vehicle
V2X Vehicle-to-Everything
VMM Virtual Machine Monitor
VNE Virtual Network Element
VNF Virtual Network Function
VoIP Voice over Internet Protocol
WAN Wide Area Network
WCDMA Wideband Code Division Multiple Access
WD Wireless Device Those skilled in the art will recognize improvements and modifications to the embodiments of the present disclosure. All such improvements and modifications are considered within the scope of the concepts disclosed herein.

What is claimed is:

1. A method performed by a shared Distributed Unit (DU) for either (a) two or more base stations or (b) two or more network slices for the same base station, where the two or more base stations or the two or more network slices comprise separate Central Units (CUs) and the shared DU comprises shared resources that are shared by the two or more base stations or the two or more network slices, the method comprising:
   receiving a Radio Resource Control (RRC) message from a User Equipment (UE), the RRC message being an RRC Setup Request message, an RRC Reestablishment Request message, or an RRC Resume Request message;
   sending a first DU-to-CU message to a first CU from among the separate CUs of the two or more base stations or the two or more network slices, the first DU-to-CU message comprising an RRC container that comprises the RRC message;
   either obtaining an indication that the first CU is a wrong CU for the RRC message or determining that the first CU is a wrong CU for the RRC message; and
   upon obtaining the indication that the first CU is a wrong CU for the RRC message or determining that the first CU is a wrong CU for the RRC message, sending another DU-to-CU message to a second CU from among the separate CUs of the two or more base stations or the two or more network slices, the other DU-to-CU message comprising an RRC container that comprises the RRC message or a related RRC message related to the RRC message.

2. The method of claim 1 comprising obtaining the indication that the first CU is a wrong CU for the RRC message.

3. The method of claim 2 wherein the RRC message is an RRC Setup Request message and the method further comprises:
   receiving a first CU-to-DU message from the first CU, the first CU-to-DU message comprising an RRC container that comprises an RRC Setup message;
   sending the RRC Setup message to the UE; and
   receiving an RRC Setup Complete message from the UE;
   wherein:
      obtaining the indication comprises:
         sending a second DU-to-CU message to the first CU, the second DU-to-CU message comprising an RRC container that comprises the RRC Setup Complete message from the UE; and receiving a second CU-to-DU message from the first CU, the second CU-to-DU message comprising information that indicates that the first CU is a wrong CU for the RRC Setup Request message; and sending the other DU-to-CU message to the second CU comprises sending a third DU-to-CU message to the second CU, the third DU-to-CU message comprising the RRC Setup Complete message.

4. The method of claim 3 wherein the second CU-to-DU message is a UE Context Release Command, and the method further comprises sending a UE Context Release Complete message to the first CU.

5. The method of claim 2 wherein the RRC message is an RRC Reestablishment Request message, and:

obtaining the indication comprises receiving a first CU-to-DU message from the first CU, the first CU-to-DU message comprising information that indicates that the first CU is a wrong CU for the RRC Reestablishment Request message; and sending the other DU-to-CU message to the second CU comprises sending a second DU-to-CU message to the second CU, the second DU-to-CU message comprising the RRC Reestablishment Request message.

6. The method of claim 5 further comprising:
receiving a second CU-to-DU message from the second CU, the second CU-to-DU message comprising an RRC container that comprises an RRC Reestablishment message;
sending the RRC Reestablishment message to the UE;
receiving an RRC Reestablishment Complete message from the UE; and
sending a third DU-to-CU message to the second CU, the third DU-to-CU message comprising an RRC container that comprises the RRC Reestablishment Complete message from the UE.

7. The method of claim 2 wherein the RRC message is an RRC Resume Request message and:

obtaining the indication comprises receiving a first CU-to-DU message from the first CU, the first CU-to-DU message comprising information that indicates that the first CU is a wrong CU for the RRC Resume Request message; and sending the other DU-to-CU message to the second CU comprises sending a second DU-to-CU message to the second CU, the second DU-to-CU message comprising the RRC Resume Request message.

8. The method of claim 7 further comprising:
receiving a second CU-to-DU message from the second CU, the second CU-to-DU message comprising an RRC container that comprises an RRC Resume message;
sending the RRC Resume message to the UE;
receiving an RRC Resume Complete message from the UE; and
sending a third DU-to-CU message to the second CU, the third DU-to-CU message comprising an RRC container that comprises the RRC Resume Complete message from the UE.

9. The method of claim 1 comprising determining that the first CU is a wrong CU for the RRC message.

10. The method of claim 9 wherein the RRC message is an RRC Setup Request message and the method further comprises:

receiving a first CU-to-DU message from the first CU, the first CU-to-DU message comprising an RRC container that comprises an RRC Setup message;

sending the RRC Setup message to the UE; and
receiving an RRC Setup Complete message from the UE; wherein:

determining that the first CU is a wrong CU for the RRC message from the UE comprises determining that the first CU is a wrong CU for the RRC message from the UE based on either a Public Land Mobile Network (PLMN) indicated by the RRC Setup Complete message or a network slice indicated by the RRC Setup Complete message; and sending the other DU-to-CU message to the second CU comprises sending a third DU-to-CU message to the second CU, the third DU-to-CU message comprising the RRC Setup Complete message from the UE.

11. The method of claim 10 wherein the second CU is selected based on either the PLMN indicated by the RRC Setup Complete message or the network slice indicated by the RRC Setup Complete message.

12. The method of claim 10 further comprising:
sending a UE Context Release Required message to the first CU; and
receiving a UE Context Release Confirm message from the first CU.

13. The method of claim 9 wherein the RRC message is an RRC Resume Request message, and:

determining that the first CU is a wrong CU for the RRC message from the UE comprises determining that the first CU is a wrong CU for the RRC message from the UE based on a MSG3 in a random access procedure performed for the UE in association with the RRC Resume Request message; and sending the other DU-to-CU message to the second CU comprises sending a second DU-to-CU message to the second CU, the second DU-to-CU message comprising the RRC Resume Request message.

14. The method of claim 13 further comprising:
receiving a second CU-to-DU message from the second CU, the second CU-to-DU message comprising an RRC container that comprises an RRC Resume message;
sending the RRC Resume message to the UE;
receiving an RRC Resume Complete message from the UE; and
sending a third DU-to-CU message to the second CU, the third DU-to-CU message comprising an RRC container that comprises the RRC Resume Complete message from the UE.

15. A network node that implements a shared Distributed Unit (DU) for either (a) two or more base stations or (b) two or more network slices for the same base station, where the two or more base stations or the two or more network slices comprise separate Central Units (CUs) and the shared DU comprises shared resources that are shared by the two or more base stations or the two or more network slices, the network node comprising:

radio front end circuitry; and
processing circuitry configured to cause the network node to:

receive a Radio Resource Control, RRC, message from a User Equipment (UE), the RRC message being an RRC Setup Request message, an RRC Reestablishment Request message, or an RRC Resume Request message;

send a first DU-to-CU message to a first CU from among the separate CUs of the two or more base stations or the two or more network slices, the first DU-to-CU message comprising an RRC container that comprises the RRC message;

either obtain an indication that the first CU is a wrong CU for the RRC message or determine that the first CU is a wrong CU for the RRC message; and upon obtaining the indication that the first CU is a wrong CU for the RRC message or determining that the first CU is a wrong CU for the RRC message, send another DU-to-CU message to a second CU from among the separate CUs of the two or more base stations or the two or more network slices, the other DU-to-CU message comprising an RRC container that comprises the RRC message or a related RRC message related to the RRC message.

16. A method performed by a Central Unit (CU) of a base station having a split between the CU and one or more Distributed Units (DUs) the method comprising:

receiving a first Distributed Unit, DU, -to-CU message from a shared DU for two or more CUs, the first DU-to-CU message comprising a Radio Resource Control (RRC) message from a User Equipment (UE), the RRC message being an RRC Setup Request message, an RRC Reestablishment Request message, or an RRC Resume Request message;

determining that a Public Land Mobile Network (PLMN) or network slice indicated for the RRC message is not served by the CU; and in response to determining that the PLMN or network slice indicated for the RRC message is not served by the CU, sending a first CU-to-DU message to the shared DU, the first CU-to-DU message comprising information that indicates that the CU is a wrong CU for the RRC message.

17. The method of claim 16 wherein the first DU-to-CU message further comprises information that indicates the PLMN or network slice indicated for the RRC message.

18. A network node that implements a Central Unit (CU) of a base station having a split between control plane and user plane, the network node comprising:

radio front end circuitry; and processing circuitry configured to cause the network node to:

receive a first Distributed Unit (DU)-to-CU message from a shared DU for two or more CUs, the first CU-to-DU message comprising a Radio Resource Control (RRC) message from a User Equipment (UE), the RRC message being an RRC Setup Request message, an RRC Reestablishment Request message, or an RRC Resume Request message;

determine that a Public Land Mobile Network (PLMN) or network slice indicated for the RRC message is not served by the CU; and in response to determining that the PLMN or network slice indicated for the RRC message is not served by the CU, send a first CU-to-DU message to the shared DU, the first CU-to-DU message comprising information that indicates that the CU is a wrong CU for the RRC message.

* * * * *

UNITED STATES PATENT AND TRADEMARK OFFICE
CERTIFICATE OF CORRECTION

| | |
|---|---|
| PATENT NO. | : 11,595,853 B2 |
| APPLICATION NO. | : 17/282822 |
| DATED | : February 28, 2023 |
| INVENTOR(S) | : Vesely et al. |

It is certified that error appears in the above-identified patent and that said Letters Patent is hereby corrected as shown below:

On the Title Page

On Page 2, in Item (56), under "OTHER PUBLICATIONS", in Column 2, Line 3, delete "OR)" and insert -- CR) --, therefor.

In the Specification

In Column 1, Line 12, delete "in it entirety" and insert -- in --, therefor.

In Column 1, Line 50, delete "e.g." and insert -- e.g., --, therefor.

In Column 2, Line 55, delete "usage" and insert -- usage of --, therefor.

In Column 4, Lines 49-53, delete "Reestablishment.................UE." and insert the same at Line 48, after "RRC" as a continuation paragraph.

In Column 7, Line 19, delete "FIG. 9 the" and insert -- FIG. 9 illustrates the --, therefor.

In Column 7, Line 22, delete "illustrate" and insert -- illustrates --, therefor.

In Column 8, Line 24, delete "Partnership" and insert -- Partnership Project --, therefor.

In Column 10, Lines 14-28, delete "Reestablishment..............above." and insert the same at Line 13, after "RRC" as a continuation paragraph.

In Column 12, Line 10, delete "unware" and insert -- unaware --, therefor.

In Column 13, Line 60, delete "unware" and insert -- unaware --, therefor.

In Column 13, Line 61, delete "gN BB" and insert -- gNBB --, therefor.

Signed and Sealed this
Tenth Day of October, 2023

Katherine Kelly Vidal
*Director of the United States Patent and Trademark Office*

CERTIFICATE OF CORRECTION (continued)
U.S. Pat. No. 11,595,853 B2

In Column 16, Line 25, delete "Alterative" and insert -- Alternative --, therefor.

In Column 16, Line 32, delete "Cell Group" and insert -- Cell Global --, therefor.

In Column 19, Line 14, delete "10106," and insert -- 1010B, --, therefor.

In Column 25, Line 34, delete "a FPGA," and insert -- an FPGA, --, therefor.

In Column 27, Line 62, delete "interchangeable." and insert -- interchangeably. --, therefor.

In Column 29, Line 42, delete "(RUIM) module," and insert -- module (RUIM), --, therefor.

In Column 32, Line 49, delete "one" and insert -- to one --, therefor.

In the Claims

In Column 39, Line 18, in Claim 16, delete "DU, -to-CU" and insert -- (DU)-to-CU --, therefor.